(12) United States Patent
Miyatani et al.

(10) Patent No.: US 12,435,973 B2
(45) Date of Patent: Oct. 7, 2025

(54) SHAPE MEASURING SYSTEM

(71) Applicant: Sony Semiconductor Solutions Corporation, Kanagawa (JP)

(72) Inventors: Yoshitaka Miyatani, Tokyo (JP); Tatsuji Ashitani, Kanagawa (JP); Ryuta Okamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 260 days.

(21) Appl. No.: 18/247,563

(22) PCT Filed: Oct. 8, 2021

(86) PCT No.: PCT/JP2021/037286
§ 371 (c)(1),
(2) Date: Mar. 31, 2023

(87) PCT Pub. No.: WO2022/102302
PCT Pub. Date: May 19, 2022

(65) Prior Publication Data
US 2024/0019244 A1 Jan. 18, 2024

(30) Foreign Application Priority Data
Nov. 10, 2020 (JP) .................................. 2020-187476

(51) Int. Cl.
*G01B 11/25* (2006.01)
*G01B 11/24* (2006.01)
(Continued)

(52) U.S. Cl.
CPC .......... *G01B 11/2518* (2013.01); *G01B 11/24* (2013.01); *G01B 11/2545* (2013.01); *H04N 25/47* (2023.01); *H04N 25/701* (2023.01)

(58) Field of Classification Search
CPC ...... H04N 25/47; H04N 25/70; H04N 25/701; G01B 11/002; G01B 11/24;
(Continued)

(56) References Cited

U.S. PATENT DOCUMENTS 6,788,807 B1 * 9/2004 Norita ................. A61B 5/0064
250/230
7,545,516 B2 * 6/2009 Jia ...................... G01B 11/2527
356/604
(Continued)

FOREIGN PATENT DOCUMENTS

CN 109510955 A * 3/2019 ............. H04N 5/357
JP H0634323 A 2/1994
(Continued)

OTHER PUBLICATIONS

International Search Report (PCT/ISA/210), International Application No. PCT/JP2021/037286, dated Dec. 28, 2021.

*Primary Examiner* — Gordon J Stock, Jr.
(74) *Attorney, Agent, or Firm* — Michael Best & Friedrich LLP

(57) ABSTRACT

Shape measuring systems are disclosed. In one example, a shape measuring system includes a light source part with a light source, a waveform control lens, and a scan mechanism. It also includes light receiving parts that each include a light receiving lens on which reflected light reflected by the measurement target among measurement light from the light source part is incident, an EVS, which is an asynchronous imaging device that is a light receiving element, an event issuing part that detects an event on the basis of output data from the EVS and outputs event data, and a transmitting part that outputs the event data to the signal processing part. A signal processing part includes an unwanted signal removing part that removes an unwanted signal resulting from inci- (Continued)

dence of secondary reflected light, and a three-dimensional calculating part that calculates a three-dimensional shape of the measurement target.

9 Claims, 17 Drawing Sheets

(51) Int. Cl.
*H04N 25/47* (2023.01)
*H04N 25/701* (2023.01)

(58) Field of Classification Search
CPC ............ G01B 11/2408; G01B 11/2416; G01B 11/2425; G01B 11/25; G01B 11/2504; G01B 11/2509; G01B 11/2513; G01B 11/2518; G01B 11/2522; G01B 11/2527; G01B 11/2531; G01B 11/2536; G01B 11/254; G01B 11/2545; G01B 11/22
See application file for complete search history.

(56) References Cited

U.S. PATENT DOCUMENTS

| | | | | |
|---|---|---|---|---|
| 7,646,550 B2 * | 1/2010 | Rohaly | ................ | H04N 13/243 359/740 |
| 7,916,932 B2 * | 3/2011 | Lee | .......................... | G06T 7/521 353/34 |
| 9,488,469 B1 * | 11/2016 | Michael | ................. | G01B 11/25 |
| 10,132,616 B2 * | 11/2018 | Wang | ..................... | G01B 11/24 |
| 10,302,420 B2 * | 5/2019 | Brandli | ................... | G01S 17/89 |
| 10,516,876 B2 * | 12/2019 | Hicks | ................... | H04N 23/741 |
| 11,736,832 B2 * | 8/2023 | Wang | ..................... | H04N 13/00 348/46 |
| 2003/0193659 A1 * | 10/2003 | Uomori | ................... | G01S 17/46 348/E5.058 |
| 2017/0094249 A1 * | 3/2017 | Maitan | ................... | H04N 23/57 |
| 2017/0108332 A1 * | 4/2017 | Cossairt | .................... | G06T 7/55 |
| 2017/0366801 A1 | 12/2017 | Horesh | | |
| 2019/0018119 A1 | 1/2019 | Laifenfeld | | |
| 2020/0341144 A1 | 10/2020 | Pacala | | |
| 2022/0092804 A1 * | 3/2022 | Chican | ................... | G06T 7/521 |
| 2022/0166944 A1 * | 5/2022 | Lagorce | ................... | G06V 20/64 |
| 2022/0196386 A1 * | 6/2022 | Heidemann | .......... | G01B 11/245 |
| 2022/0207761 A1 * | 6/2022 | Narasimhan | ....... | G01B 11/2513 |
| 2022/0349707 A1 * | 11/2022 | Mitani | ............... | G01B 11/2527 |
| 2023/0199340 A1 * | 6/2023 | Sakane | .................. | H04N 25/47 348/135 |
| 2024/0064422 A1 * | 2/2024 | Ke | .......................... | H04N 25/60 |
| 2024/0371115 A1 * | 11/2024 | Matsumori | ............ | H04N 5/272 |
| 2024/0412394 A1 * | 12/2024 | Zorlubas | ............ | G01B 11/2513 |

FOREIGN PATENT DOCUMENTS

| | | | |
|---|---|---|---|
| JP | 2005241570 A | 9/2005 | |
| JP | 2015508584 A | 3/2015 | |
| JP | 2015072197 A | 4/2015 | |
| JP | 2016517513 A | 6/2016 | |
| JP | 2019134271 A | 8/2019 | |
| WO | WO-2023057208 A1 * | 4/2023 | ......... G01B 11/2518 |

* cited by examiner

FIG. 10
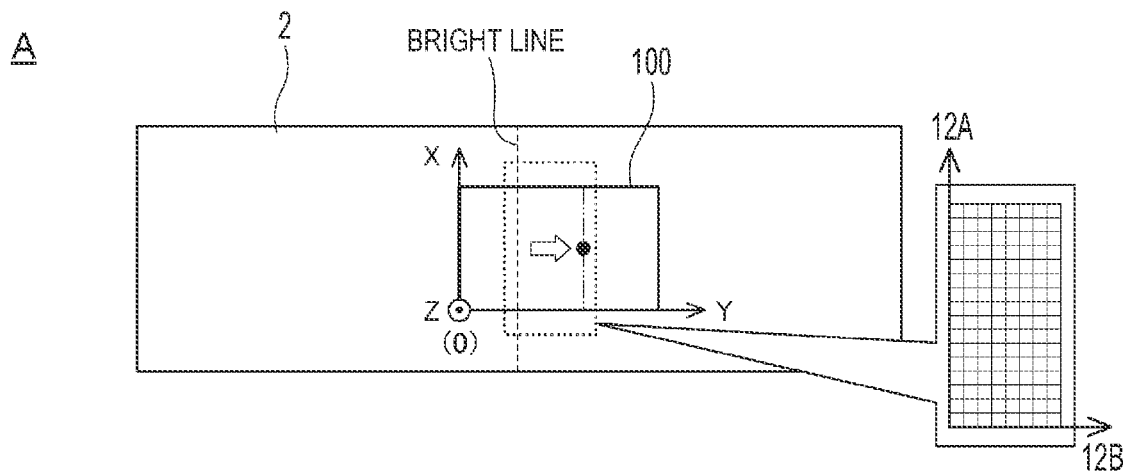
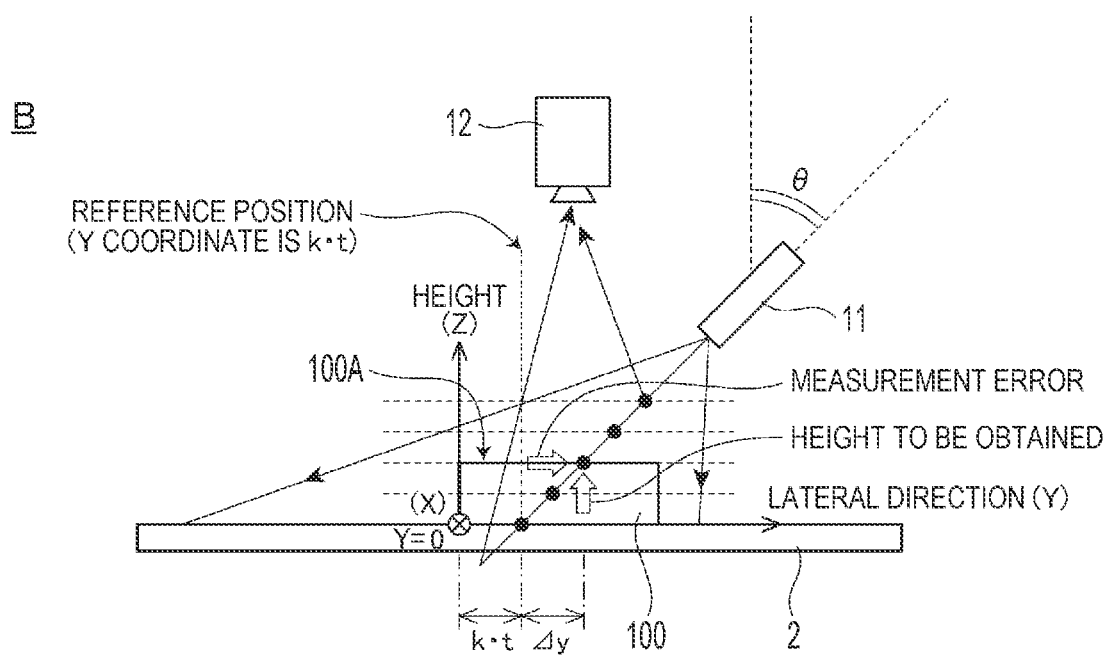

SHAPE MEASURING SYSTEM

TECHNICAL FIELD

The present disclosure relates to a shape measuring system that three-dimensionally measures a shape of a measurement target.

BACKGROUND ART

A non-scanning (asynchronous) imaging device called event-based vision sensor (EVS) is known as opposed to a scanning (synchronous) imaging device that performs imaging in synchronization with a synchronization signal such as a vertical synchronization signal (see, for example, Patent Document 1). The non-scanning imaging device can detect, as an event, that a luminance change amount of a pixel that photoelectrically converts incident light has exceeded a predetermined threshold value.

One example of applications of the non-scanning imaging device is a shape measuring device using a light-section method. The light-section method is a method used for detecting a shape abnormality of a measurement target (hereinafter referred to as an "object to be measured") especially in an inspection process in a factory or the like. In shape measurement using the light-section method, a width, a height, and the like of an object to be measured (object) are measured from an imaging cross-section shape obtained when linear light is emitted from a light projecting part onto the object to be measured and reflected light from the object to be measured based on the emitted light is received by a non-scanning imaging device.

CITATION LIST

Patent Document

Patent Document 1: Japanese Patent Application Laid-Open No. 2019-134271

SUMMARY OF THE INVENTION

Problems to be Solved by the Invention

As described above, for example, a shape measuring device using the light-section method, which is one of applications of the non-scanning imaging device, measures a shape by receiving light reflected by an object to be measured based on light emitted from a light projecting part. However, in this case, it is sometimes impossible to perform correct shape measurement since an imaging shape is different from an original shape due to ambient light, a degree of reflection of light emitted from a light projecting part, or the like.

For example, when reflected light (regular reflected light) reflected at a certain measurement point and directed to a light receiving part is taken in, there is a possibility that reflected light (secondary reflected light) other than the regular reflected light also enters the light receiving part. In this case, especially as for an object to be measured such as an object having a large irregularity difference, there is a possibility that accurate shape measurement cannot be performed since secondary reflected light and regular reflected light travel on optical paths greatly different or at angles greatly different and a plurality of different detection values is obtained.

An object of the present disclosure is to acquire accurate three-dimensional information even for an object to be measured having a large irregularity difference on a measurement surface.

Solutions to Problems

The present disclosure has been made to accomplish the above object, and a first aspect of the present disclosure is a shape measuring system including: a light source part that emits measurement light to a measurement target; a light receiving part that receives reflected light that is the measurement light reflected from the measurement target; a signal processing part including a three-dimensional shape calculating part that calculates a three-dimensional shape of the measurement target on the basis of event data generated from the reflected light reflected by the measurement target and incident on the light receiving part and an unwanted signal removing part that removes an unwanted signal generated when unwanted light other than the reflected light is incident on the light receiving part from an outside; and a scan mechanism that sweep-scans the measurement target with the measurement light projected from the light source part to the measurement target by moving the light source part or the measurement target.

In the first aspect, the scan mechanism may be provided in the light source part; the light source part may include a light source and a waveform control lens that performs waveform control of light from the light source; and the light receiving part may include a light receiving lens, an event-based vision sensor (EVS), which is an asynchronous imaging element that captures a temporal change of reflected light passing through the light receiving lens among beams of the reflected light and outputs an event signal, an event issuing part that detects an event on the basis of output data from the EVS and outputs event data, and a transmitting part that outputs the event data to the signal processing part.

In the first aspect, the light source part may be a single light source part; and
a first light receiving part and a second light receiving part whose positions are shifted from each other may be provided as the light receiving part.

Furthermore, in the first aspect of the present disclosure, a first light source part and a second light source part whose positions are shifted from each other may be provided as the light source part;
the light receiving part may be a single light receiving part; and
the signal processing part may include a control signal transmitting part that outputs a control signal to each of the scan mechanisms at time-divided time intervals for each pixel column.

Furthermore, in the first aspect of the present disclosure, a first light source part including a first light source that emits light having a first wavelength and a second light source part including a second light source that emits light having a second wavelength may be provided as the light source part;
the light receiving part may be a single light receiving part;
the EVS may include two divided areas that are a first divided area and a second divided area in each pixel column;
among measurement light having two different types of wavelengths emitted from the light sources, light having the first wavelength and light having the second wavelength may be reflected by the measurement target, and the first divided area may include a first filter having a first wavelength transmission characteristic that selectively transmits the reflected light having the first wavelength; and the second divided area may include a second filter having a second wavelength transmission characteristic that selectively transmits the light having the second wavelength.

Furthermore, in the first aspect of the present disclosure, a first light source part including the first light source and a second light source part including a second light source may be provided as the light source part;

the first light source part may include a first optical element that generates first measurement light having a first polarization plane from light emitted from the first light source;

the second light source part may include a second optical element that generates second measurement light having a second polarization plane from light emitted from the second light source;

the light receiving part may be a single light receiving part;

the EVS may be divided into two areas that are a first divided area and a second divided area for each pixel column;

of two types of measurement light that are the first measurement light and the second measurement light, first reflected light having the first polarization plane and second reflected light having the second polarization plane may be reflected by the measurement target and incident on the light receiving part, and the first divided area may include a first film that selectively transmits the first reflected light; and the second divided area may include a second film that selectively transmits the second reflected light.

Furthermore, in the first aspect, the first polarization plane may be linearly polarized light vibrating in a vertical direction, and the second polarization plane may be linearly polarized light vibrating in a horizontal direction.

Furthermore, in the first aspect of the present disclosure, the light source part may be a single light source part; the light source in the light source part may include dividing means for dividing light from the light source into at least three types of wavelength bands;

the light receiving part may be a single light receiving part;

the EVS may include three divided areas that are a first to third divided areas for each pixel column;

among measurement light of the three different types of wavelength bands emitted from the light source, reflected light of the three types of wavelength bands may be reflected by the measurement target, and the first divided area may include a first filter having a wavelength transmission characteristic that selectively transmits reflected light of a first wavelength band among the reflected light of the three types of wavelength bands;

the second divided area may include a second filter having a wavelength transmission characteristic that selectively transmits reflected light of a second wavelength band among the reflected light of the three types of wavelength bands reflected by the measurement target; and the third divided area may include a third filter having a wavelength transmission characteristic that selectively transmits reflected light of a third wavelength band among the reflected light of the three types of wavelength bands reflected by the measurement target.

Furthermore, in this aspect, the dividing means may include a prism that divides white light from the light source into light of three types of wavelength bands; and the light of the three types of wavelength bands may be light of a red wavelength band, light of a green wavelength band, and light of a blue wavelength band.

Furthermore, in the first aspect, the EVS may compare a signal voltage based on a temporal change of the reflected light with a threshold voltage, and may output an event signal by determining that the signal voltage is smaller than or larger than the threshold voltage.

The shape measuring system of the present disclosure is configured to capture a plurality of pieces of independent optical data for respective shortest optical paths via a plurality of optical paths. Therefore, data from regular reflected light (traveling on the shortest optical paths) among beams of reflected light captured from the optical paths have a same value as long as the regular reflected light is one reflected at a same reflection point regardless of an optical path on which the regular reflected light travels. That is, as for a physical shape (for example, a height) at a same point on an object to be measured, the obtained shape (for example, the height) is uniquely determined (only one shape at a same position). Therefore, a value of a height at a same point does not vary regardless of a shortest optical path (route) on which reflected light travels, as long as the reflected light is regular reflected light. Therefore, if a pair of a same data value that should always exist is found, the data is data obtained from regular reflected light, and therefore it is possible to detect which data is true data concerning a measurement surface with certainty and accuracy. That is, even if unnecessary secondary reflected light among reflected light reflected and scattered on the measurement surface of the object to be measured enters the light receiving part, occurrence of erroneous distance measurement resulting from data regarding the secondary reflected light can be suppressed. Moreover, according to the shape measuring system of the present disclosure, an event-based vision sensor (EVS), which is an asynchronous imaging device, is used as the light receiving element, and therefore high-speed and accurate shape measurement can be realized although details will be described later.

BRIEF DESCRIPTION OF DRAWINGS

FIG. 10A is an explanatory view illustrating a scanning direction of slit light with respect to an object to be measured according to the first configuration example of the present disclosure, and FIG. 10B is an explanatory view illustrating a detection principle of a measurement value related to a height of the object to be measured.

MODE FOR CARRYING OUT THE INVENTION

Hereinafter, modes for carrying out the technique of the present disclosure (hereinafter referred to as an "embodiment") will be described in detail below with reference to the drawings. The technique of the present disclosure is not limited to that of each embodiment, and various numerical values, materials, and the like in each embodiment are examples. In the following description, same elements or elements having same functions are given same reference signs, and repeated description thereof is omitted. Note that the description will be given in the following order.

Figure 1:
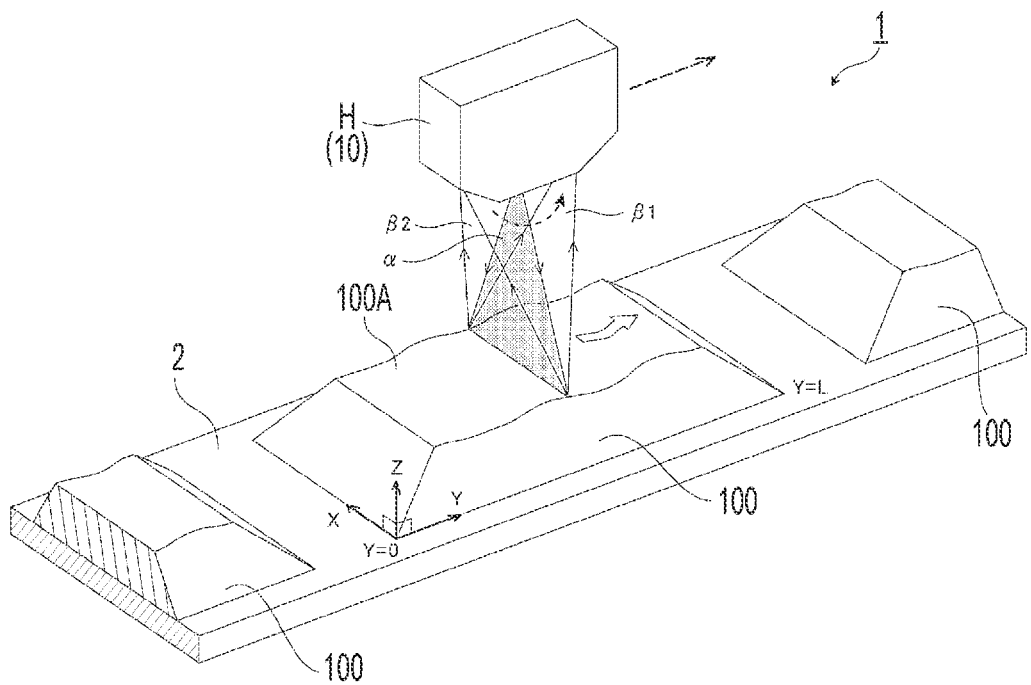
FIG. 1 is a schematic diagram illustrating an outline of a configuration of a shape measuring system according to a first embodiment of the present disclosure.
Figure 2:
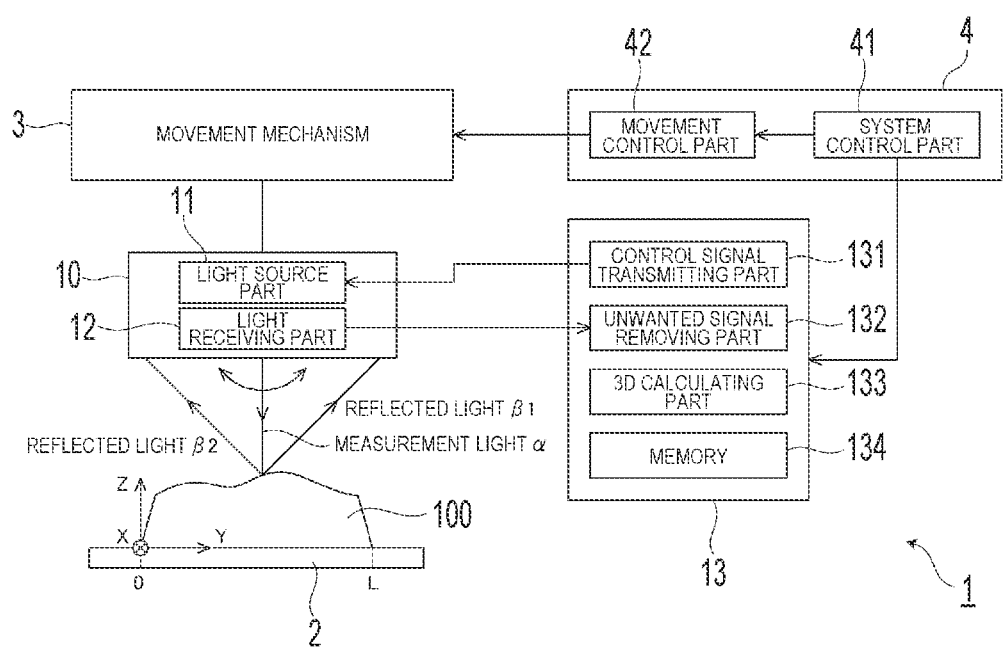
FIG. 2 is a schematic configuration diagram illustrating a shape measuring system according to a second embodiment of the present disclosure.

1. Shape measuring system according to first embodiment of present disclosure
2. Shape measuring system according to second embodiment of present disclosure
   2-1. First configuration example . . . single light source+plurality of light receiving parts
   2-2. Second configuration example . . . plurality of light sources+single light receiving part (light source time division control)
   2-3. Third configuration example . . . plurality of light sources+single light receiving part (wavelength division control)
   2-4. Fourth configuration example . . . plurality of light sources+single light receiving part (polarization switching control)
   2-5. Fifth configuration example . . . single light source+single light receiving part (dispersion of light by prism)
3. Configurations which present disclosure can take 1. Shape Measuring System According to First Embodiment FIG. 1 is a schematic view illustrating a shape measuring system according to a first embodiment of the present disclosure, and FIG. 2 is a block diagram illustrating a schematic configuration of the shape measuring system of the present disclosure. In FIG. 1 and subsequent drawings, three-dimensional Cartesian coordinates are set in which a depth direction of an object to be measured, a scan and movement direction, and a height direction of the object to be measured are clarified as an X direction, a Y direction, and a Z direction that are orthogonal to each other, respectively. Note that the present disclosure adopts a left-handed coordinate system. The origin is particularly specified at one of four corners of the object to be measured.

[Configuration of Shape Measuring System]

As a schematic configuration, a shape measuring system 1 of the present disclosure includes a stage 2, a shape measuring device 10 that three-dimensionally measures a measurement surface 100A of an object 100 to be measured mounted on the stage 2 in a standing state, a movement mechanism 3 constituting a scan mechanism that intermittently moves the shape measuring device 10 in the Y direction, a control part 4 that controls the movement mechanism 3, and a signal processing part (hereinafter referred to as a "signal processing unit") 13 that performs signal processing in the shape measuring device 10. Note that as illustrated in FIG. 2, the shape measuring device 10 of the present embodiment includes a light source part 11 and a light receiving part 12, and is housed in a head H.

In the shape measuring system 1 of the present disclosure, a non-scanning (hereinafter referred to as "asynchronous") imaging method called event-based vision sensor (EVS) is used. This will be described later in detail. Note that in the present embodiment, shape measuring operation is sequentially and continuously performed on a plurality of objects 100 to be measured illustrated in FIG. 1 from a left one to a right one. For this purpose, the movement mechanism 3 is provided. Needless to say, however, the movement mechanism 3 is not needed in a case where shape measurement is performed only on a single object 100 to be measured.

The stage 2 of the present embodiment is a flat plate having a rectangular shape in plan view and having a uniform thickness, and two longitudinal and lateral sides thereof are aligned so as to coincide with the X direction and the Y direction, respectively. The stage 2 of the present embodiment is placed on a base (not illustrated) or the like.

As illustrated in FIGS. 1 and 2, the movement mechanism 3 intermittently moves the head H in which the shape measuring device 10 is housed in the Y direction at high speed in accordance with measurement of the object 100 to be measured under control of a movement control part 42, which will be described later. In this way, measurement of the objects 100 to be measured is sequentially performed. For example, a robot may be used as the movement mechanism 3 for this purpose. Alternatively, a rack-and-pinion, a ball screw, an endless belt, a wire, or any of other appropriate members may be used. Note that although the movement mechanism 3 of the present embodiment intermittently moves the head H in the Y direction, the present disclosure is not particularly limited to this. That is, the stage 2 or the base may move instead of the head H. Furthermore, for example, the movement mechanism of the present disclosure may move a light source part side inside the head H or move only a light source inside the light source part as in the second embodiment.

The control part 4 includes a system control part 41 and the movement control part 42. The system control part 41 controls the movement control part 42 and the shape measuring device 10 at a predetermined timing. The movement control part 42 controls the movement mechanism 3 that intermittently performs the movement operation of the shape measuring device 10. The control part 4 can move the head H at a high speed from a start point to an end point of the object 100 to be measured in the Y direction.

The signal processing unit 13 acquires a three-dimensional shape of the object 100 to be measured by performing predetermined signal processing at high speed based on "event data" obtained by the light receiving part 12 of the shape measuring device 10. As illustrated in FIG. 2, the signal processing unit 13 of the present embodiment includes a control signal transmitting part 131, an unwanted signal removing part 132, a three-dimensional shape calculating part (hereinafter referred to as a "3D calculating part") 133, and a memory 134. Note that details of each of the above elements including "event data" will be described later.

The object 100 to be measured is not particularly limited, but in the first embodiment of the present disclosure, for example, a bottom surface thereof is rectangular, and irregularities are formed on an upper surface thereof that is a measurement surface. The shape measuring device 10 of the present disclosure can detect and measure a shape at a high speed by using the EVS and with high accuracy by using an arithmetic expression described later even in a case where an irregularity difference is large.

[Action and Effect of First Embodiment]

The shape measuring device 10 of the shape measuring system 1 of the present disclosure three-dimensionally measures a shape concerning a length (Y), a depth (X), and a height (Z) of the object 100 to be measured. As means of shape measurement of the present disclosure, slit light (hereinafter sometimes referred to as "measurement light") having a wide band shape or a fan shape expanding in a tapered shape generated by the light source part 11 in the head H is used. Note that the shape of the slit light is not limited to the above shape. For example, the shape may be a specific shape that corresponds to the shape of the object to be measured or the measurement surface and is effective for shape measurement.

The shape measuring device 10 sequentially performs the shape measurement in units of one pixel column (column) by sequentially projecting the slit light in a direction of a vertical cross section (X-Z plane) of the object 100 to be measured. Furthermore, at a same time as the slit light projecting operation in the X-Z direction, a scan mechanism 113 in the light source part 11 illustrated in FIG. 3 operates to perform scanning operation from left to right in the Y (lateral) direction. That is, a series of sweep operations is performed from a start end to a terminal end in the Y (lateral) direction. In this manner, the slit light is projected and swept in the Y direction, and thus three-dimensional shape measurement is performed.

In the shape measuring system 1 according to the present disclosure, at least two types of reflected light (regular reflected light, which will be described later) that travel on shortest optical paths different from each other can be used as measurement light on a reflection (or return path) side traveling toward the light receiving part (not illustrated) after measurement light on a light projection (or outbound path) side traveling from a light source in the light source part (not illustrated) toward the object 100 to be measured is scattered and reflected at a same measurement point (measurement position) of the object 100 to be measured. Note that a specific shape measuring method using this reflected light will be described in detail together with a qualitative principle thereof in a second embodiment, which will be described later.

The shape measuring operation for each object 100 to be measured by laser light projected by the shape measuring device 10 has been described above. In the present embodiment, this series of shape measuring operations is sequentially performed on each object 100 to be measured. Therefore, the movement control part 42 controls the intermittent operation of the movement mechanism 3 at regular time intervals. In this way, when the measurement operation for one object to be measured is completed, the head H of the shape measuring device 10 is moved by one step to a next object to be measured in the Y direction. By repeating such an intermittent operation every time on the head H, a three-dimensional (hereinafter referred to as "3D") shape of the measurement surface 100A of each object 100 to be measured can be successively acquired by the EVS.

As described above, in the present embodiment, an asynchronous imaging device called EVS is used, and use of this EVS can produce an effect that shape measurement can be performed at a high speed in terms of time unlike a conventional sensor.

2. Shape Measuring System of Shape Measuring System of Second Embodiment (2-1. First Configuration Example)

Next, a shape measuring device included in a shape measuring system according to a second embodiment of the present disclosure will be described in detail with reference to the drawings.

Figure 3:
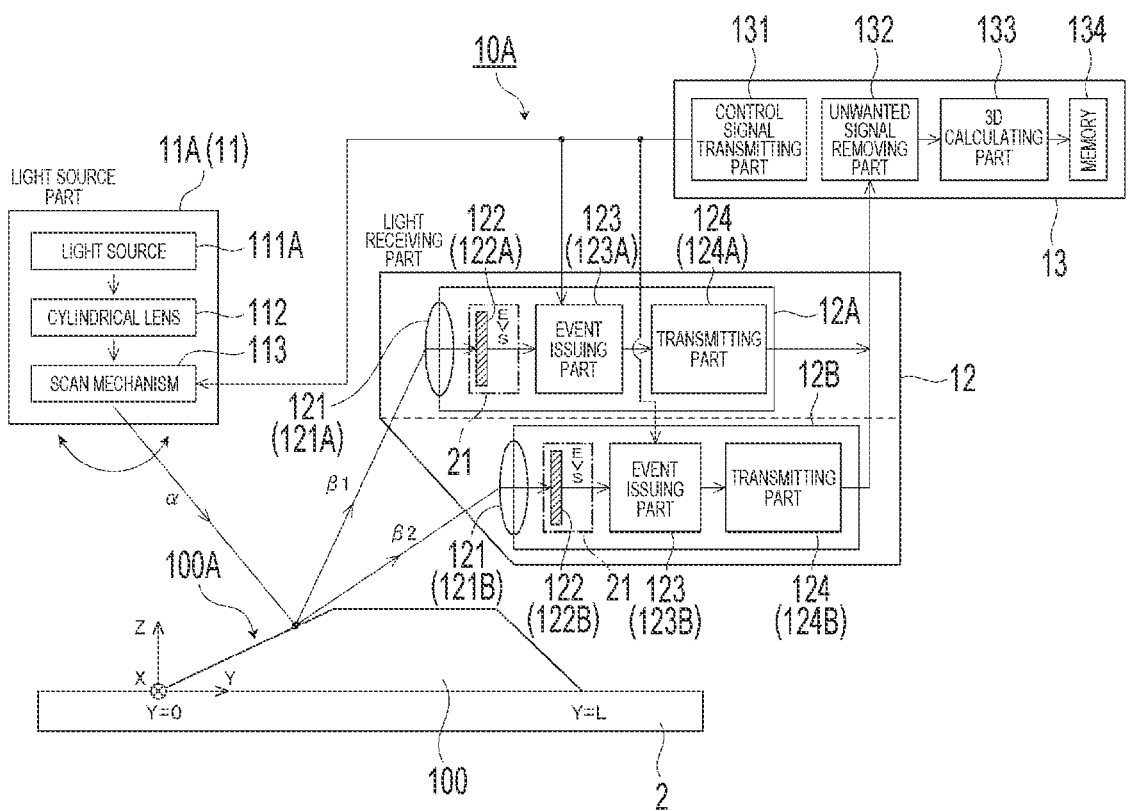
FIG. 3 is a configuration block diagram illustrating an imaging device illustrating a first configuration example according to the second embodiment of the present disclosure.

FIG. 3 illustrates a first aspect (hereinafter referred to as a "first configuration example") of the second embodiment according to the present disclosure. Specifically, FIG. 3 illustrates a configuration of a shape measuring device 10A according to the first configuration example, especially configurations of a light source part 11, a light receiving part 12, and a signal processing unit 13 included in the shape measuring device 10A. Note that same parts as those in FIGS. 1 and 2 are given same reference signs, and repeated description thereof is avoided.

The shape measuring device 10A of the present disclosure may have a same configuration as or a different configuration from that used in the shape measuring system 1 of the first embodiment. The shape measuring device 10A of the first configuration example includes a single light source part 11 and a plurality of light receiving parts 12.

As described above, according to the shape measuring device 10A of the present configuration example, the signal processing unit 13 is housed in a head H in addition to the single light source part 11 and the two light receiving parts 12 including a first light receiving part 12A and a second light receiving part 12B. Note that only the light source part 11 and the light receiving parts 12 may be housed in the head H of the present disclosure, and the signal processing unit 13 may be installed separately, and data may be exchanged by using wireless communication, infrared communication, or the like.

It is preferable that the two light receiving parts 12, that is, the first light receiving part 12A and the second light receiving part 12B be separated as far as possible. For example, the shape measuring device 10A of the first configuration example can be installed at positions opposite to each other in the lateral (Y) direction relative to the light source part 11, but need not be arranged symmetrically about the light source part 11.

[Configuration of Shape Measurement Device]

The light source part 11 (hereinafter referred to as a "light source part 11A") of the present configuration example is a single light source part as described above, and specifically includes a light source 111A, a waveform control lens 112, and a scan mechanism 113, as illustrated in FIG. 3. Note that, in the following description of the present configuration example, "A" will be omitted especially for the light source 111A among the elements of the light source part 11A in order to simplify the description.

As the light source 111, a semiconductor laser (hereinafter referred to as a "semiconductor laser 111") can be used. The semiconductor laser 111 according to the present embodiment can, for example, continuously oscillate laser light having a blue wavelength (λb). In the first configuration example, this blue light is used as measurement light for measuring an object 100 to be measured. Note that the laser light used in the light source part of the present disclosure is not particularly limited to this blue light. The light source of the present configuration example preferably emits light of high luminance and has a certain degree of directivity. Furthermore, the illumination light to be used does not need to be coherent like the laser light, but is preferably one whose chromatic aberration and other aberrations are small.

Note that in a case where a laser is used as the light source, an edge emitting laser (EEL) may be used or a vertical cavity surface emitting laser (VCSL) may be used.

As the waveform control lens 112, a waveform shaping lens (hereinafter referred to as a "waveform shaping lens") is used. This waveform shaping lens is an optical element for waveform-processing emitted laser light into a slit shape. As the waveform shaping lens of the present configuration example, a cylindrical lens (hereinafter referred to as a "cylindrical lens 112") is used. Specifically, for example, a waveform shape of the blue laser light oscillated and emitted in a beam shape from the semiconductor laser 111 is shaped (processed) into thin and wide rectangular (band-shaped) light in a traveling direction or thin fan-shaped light in the traveling direction (hereinafter, these are referred to as "line slit light" or simply as "slit light"). The line slit light of the present configuration example is emitted so that an entire pixel (COLUMN) column having a narrow width and an elongated length along the depth (X) direction of the object 100 to be measured is simultaneously irradiated with slit light like the one illustrated in FIG. 1.

The scan mechanism 113 performs sweep scanning by sending out a laser beam whose waveform has been formed into a skit shape by the cylindrical lens 112 in the Y (ROW) direction with passage of time. By thus sequentially sending out the laser light in the Y direction, the scan mechanism 113 can three-dimensionally measure a shape of an entire surface of a measurement surface 100A of the object 100 to be measured.

Note that, in the configuration example of the present disclosure, such a type is employed in which the shape measuring device 10A side is scanned with respect to the object 100 to be measured that is placed still to measure a three-dimensional shape of the object 100 to be measured. In the present disclosure, such a type may be employed in which the shape measuring device 10A side is placed still and the object 100 side is moved and scanned by appropriate means of transportation to perform measurement. However, in a case where the latter type is employed, when a moving object appears, this object is captured and a signal is output due to characteristics of an imaging device 122, which will be described later. Therefore, it is necessary to make consideration such as reducing illumination light and measuring a shape in a dark environment, adopting an infrared region for a laser light source wavelength, and mounting an optical filter in the same wavelength band in front of an imaging element of the imaging device 122.

As illustrated in FIG. 3, the light receiving part 12 of the present configuration example includes a light receiving lens 121, the imaging device 122, an event issuing part 123, and a transmitting part 124. Furthermore, in the first configuration example, in order to facilitate understanding of the description, a former-stage part of the light receiving part 12 will be described as a "light receiving function part" and a latter-stage part of the light receiving part 12 will be described as a "detection function part" for convenience of description.

In the present configuration example of the present disclosure, specifically, the first light receiving part 12A includes a first light receiving lens 121A, a first imaging device 122A, a first event issuing part 123A, and a first transmitting part 124A. Meanwhile, specifically, the second light receiving part 12B includes a second light receiving lens 121B, a second imaging device 122B, a second event issuing part 123B, and a second transmitting part 124B. Note that, in the following present configuration example, in order to simplify the description, only three-digit numbers are given as reference signs given to the above constituent elements, and "A" and "B" are omitted.

The light receiving function part, which is the former-stage part, receives reflected light (scattered light) that is the line slit light projected from the light source part 11A and then reflected by the measurement surface 100A. The light receiving function part of the present embodiment can include the light receiving lens 121 and an imaging part 21, which will be described later, including an optical element including the imaging device 122 and various circuits. With this configuration, the light receiving function part acquires luminance (luminance change) data regarding the shape of the object 100 to be measured obtained by measuring the object 100 in units of a pixel column. Then, an information signal such as an external shape and position information associated with the external shape, that is, a signal for detecting event data, which will be described later, is output to the detection function part in the latter-stage part. Note that the imaging part 21 will be described in detail later.

Among the members of the light receiving function part, the light receiving lens 121 forms an image of the incident line slit light on the imaging device 122. The light receiving lens of the present disclosure simply forms an image of the reflected light on the imaging device 122.

The imaging device 122 uses the event-based vision sensor (EVS) described above as a sensor of a system different from a conventional system. The EVS includes an asynchronous imaging device, and pixels that photoelectrically convert incident light reflected by the object 100 to be measured are two-dimensionally arranged in a matrix. In this EVS, a plurality of pixel circuits is arranged in a two-dimensional lattice pattern. A set of pixel circuits aligned in the depth (X) direction is referred to as "row", and a set of pixel circuits aligned in the horizontal (Y) direction orthogonal to this row is referred to as "column". In each EVS, a photoelectric conversion signal is taken into each pixel on the basis of received reflected light beams β1 and β2 according to image information for each pixel column (column). The input data is output to the event issuing part 123.

On the other hand, the detection function part performs signal processing. In this way, a signal from the incident light is taken in as an event. Since the EVS outputs, for each pixel, only pixel information indicating that a luminance change has occurred in the pixel, it is possible to stably output a signal without being affected by a color or reflectance of an object to be measured or environmental light. The detection function part may include the event issuing part 123 and the transmitting part 124.

The event issuing part 123 constitutes a part of the detection function part. The event issuing part 123 receives a synchronization signal from a control signal transmitting part 131, and outputs an event signal for 3D restoration (described later) regarding a surface shape of the object 100 to be measured obtained from the EVS 122 to the transmitting part 124 in synchronization with the synchronization signal.

That is, when detecting an event, the event issuing part 123 of the present embodiment detects a position of the event from a synchronization signal input at the time t. This position detection will be described later with reference to FIGS. 5 to 8. Furthermore, the event issuing part 123 detects a change in luminance as "address event" in real time for each received pixel address. When detecting the address event, the event issuing part 123 performs luminance comparison with an immediately preceding address event. A luminance change amount exceeding a predetermined threshold value is detected and taken in as an "event", and data (referred to as "event data") including position information (coordinate data) indicating a coordinate position of the event is output to the transmitting part 124. The event data can include time information indicating a relative time of occurrence of the event in addition to the position information. Furthermore, this may include gradation information indicating a signal level.

The transmitting part 124 outputs the event data for three-dimensional restoration output from the event issuing part 123 to an unwanted signal removing part 132 (described later) on the signal processing unit 13 side.

[Configuration of Signal Processing Unit]

The signal processing unit 13 of the present embodiment detects and stores three-dimensional data of the object 100 to be measured at high speed on the basis of data obtained from the light receiving part 12. As described above, the signal processing unit 13 includes the control signal transmitting part 131, the unwanted signal removing part 132, a 3D calculating part 133, a memory 134, and the like.

Figure 4:
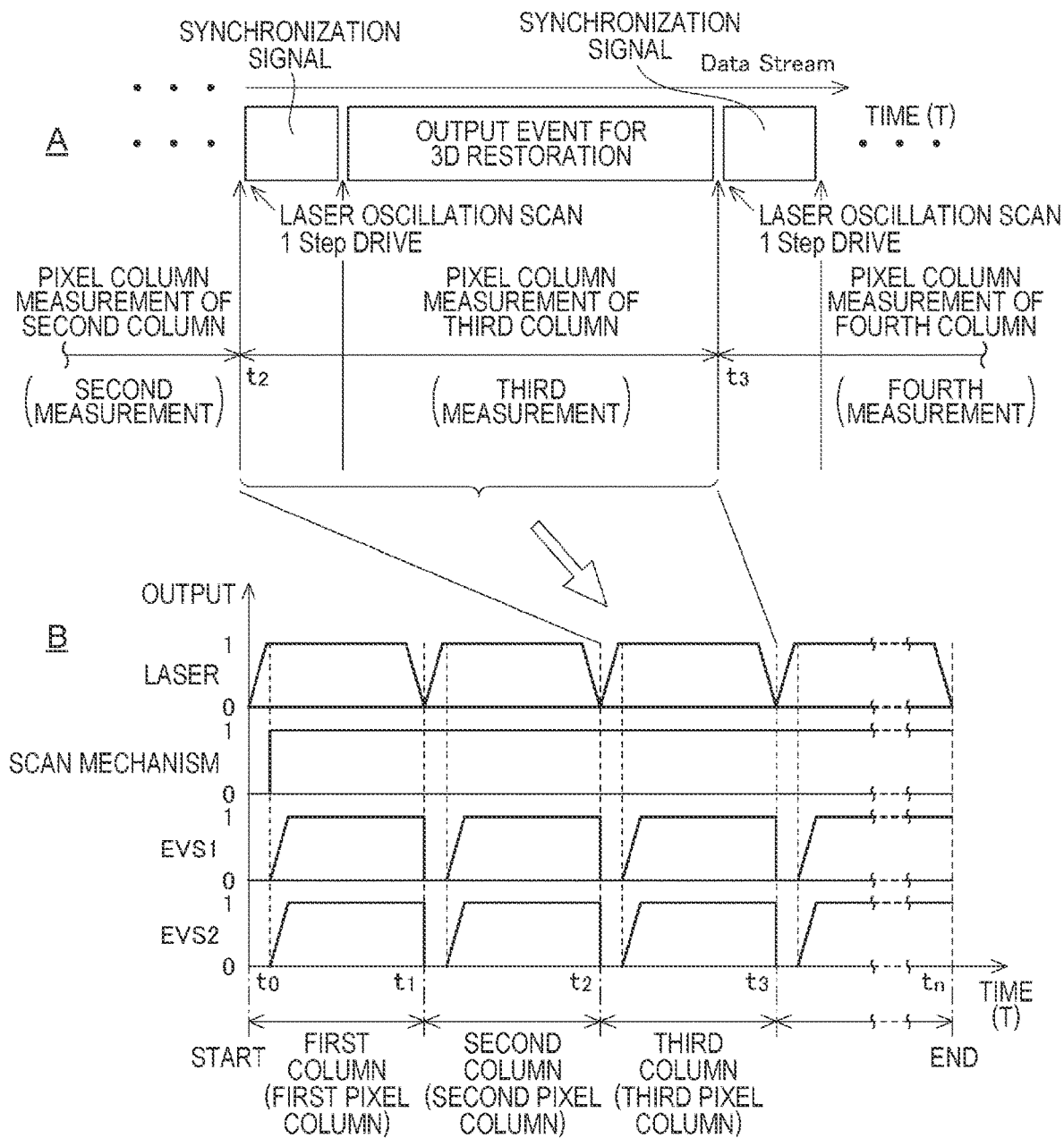
FIG. 4 is an output diagram illustrating temporal processing operation of an output signal in each pixel column (pixel array) in a light receiving part of the first configuration example of the present disclosure.

As illustrated in FIG. 4, the control signal transmitting part 131 outputs a control signal for starting the light source 111 and the scan mechanism 113 to these members at start (time $t_0$) of the operation for measuring the shape of the object 100 to be measured. That is, sweep scanning of the object 100 to be measured in the lateral (Y) direction is also started in synchronization with laser oscillation operation at the start of the shape measurement. Furthermore, the control signal transmitting part 131 outputs a synchronization signal to the event issuing part 123 of each of the light receiving parts 12A and 12B in order to drive the event issuing part 123 in synchronization with the laser oscillation operation of the light source 111 and the sweep operation of the scan mechanism 113. As a result, the event issuing part 123 can associate a synchronization signal with event data at a same time as input of luminance signal via the EVS 122. In this way, shape measurement data in all pixels for the entire surface of the object 100 to be measured is generated.

Note that in the case of a system in which a large number of objects to be measured are arranged as illustrated in FIG. 1, shape measurement of a plurality of objects to be measured can be performed one after another by the intermittent operation of the movement mechanism 3 that moves the shape measuring device 10A in the Y direction (this is referred to as "plural-objects measurement"). On the other hand, in the case of a shape measuring system for a single object that does not include a movement mechanism, a shape measuring operation for a single object to be measured can be successively performed plural times repeatedly in terms of time (this is referred to as "single-object measurement") by performing similar control concerning the one course of sweep scanning operation. As a result, in the single-object measurement, a temporal change of the object 100 to be measured can be detected at minute time intervals. In the configuration examples subsequent to the first configuration example, the "single-object measurement" type is adopted, which is convenient, for example, in a situation where a shape changes from moment to moment. Note that, in the present disclosure, "plural-object measurement" may be adopted for the configuration examples subsequent to the first configuration example.

The unwanted signal removing part 132 removes an unwanted signal related to the multipath reflected light (this is sometimes referred to as "secondary reflected light") that leads to a measurement error occurring when the laser light from the light source 111 is incident on the measurement surface 100A. The multipath reflected light is light incident from a path for which measurement is not intended, and is generated mainly because reflection occurs a plurality of times on various objects in an outside world. The unwanted signal removing part 132 of the present configuration example removes an unwanted signal generated by the secondary reflected light incident at an incident angle different from an incident angle (reference angle) of especially necessary scattered light (this becomes "regular reflected light", which will be described later) of the slit light from the light source part 11A incident on the imaging device 122.

Specifically, coordinates (X, Y, Z) of each pixel corresponding to a specified point on the surface of the object 100 to be measured, that is, an incident point of the slit light at a certain time t are uniquely determined. That is, in the light receiving part 12, an incident angle of reflected light from the light source 111 toward the object 100 to be measured is a certain specific value (regular incident angle). An incident angle at which reflected light (sometimes referred to as "regular reflected light") that is the light (sometimes referred to as "regular incident light") incident at the regular incident angle reflected by the object 100 to be measured enters the imaging device 122 is same if a height is same as an immediately preceding point. Accordingly, in a case where an incident angle of the regular reflected light on the light receiving part 12 is different, there is an irregularity difference and a height is different as compared with a measurement surface at the immediately preceding point. That is, this shows that the height of the object 100 to be measured has changed.

The secondary reflected light is sometimes erroneously incident on the light receiving part 12 at an incident angle different from the regular incident angle. As a result, there is a possibility that a shape at the point is erroneously detected. In view of this, the unwanted signal removing part 132 removes an electric signal (hereinafter referred to as an "unwanted signal") other than an electric signal (hereinafter referred to as a "regular electric signal") to be generated from a received light intensity or a received light amount obtained when light is incident at an intended regular incident angle, that is, an electric signal different from a unique photocurrent value or photovoltaic value.

The 3D calculating part 133 generates a two-dimensional shape (referred to as "two-dimensional data") obtained for each pixel column by cutting the object 100 to be measured into a line shape with each slit light by using an arithmetic expression that will be described later on the basis of the regular electric signal after removal of the unwanted signal generating unwanted noise by the unwanted signal removing part 132. Then, the scan mechanism 113 sweeps and moves the slit light in the Y direction, and thereby a shape (hereinafter referred to as a "3D shape") of the object 100 to be measured is three-dimensionally generated by combining pieces of two-dimensional data of the line shape.

The memory 134 stores therein shape information regarding a three-dimensional shape which is event data for each pixel of the object 100 obtained by processing by a necessary circuit on the basis of data regarding the three-dimensional shape of the measurement surface 100A of the object 100 sequentially captured by the shape measuring device 10A, especially, height information (or thickness information).

[Configuration Example of Imaging Part]

Next, the imaging part 21 including the imaging device 122 of the present disclosure will be described with reference to FIGS. 5 to 8.

Figure 5:
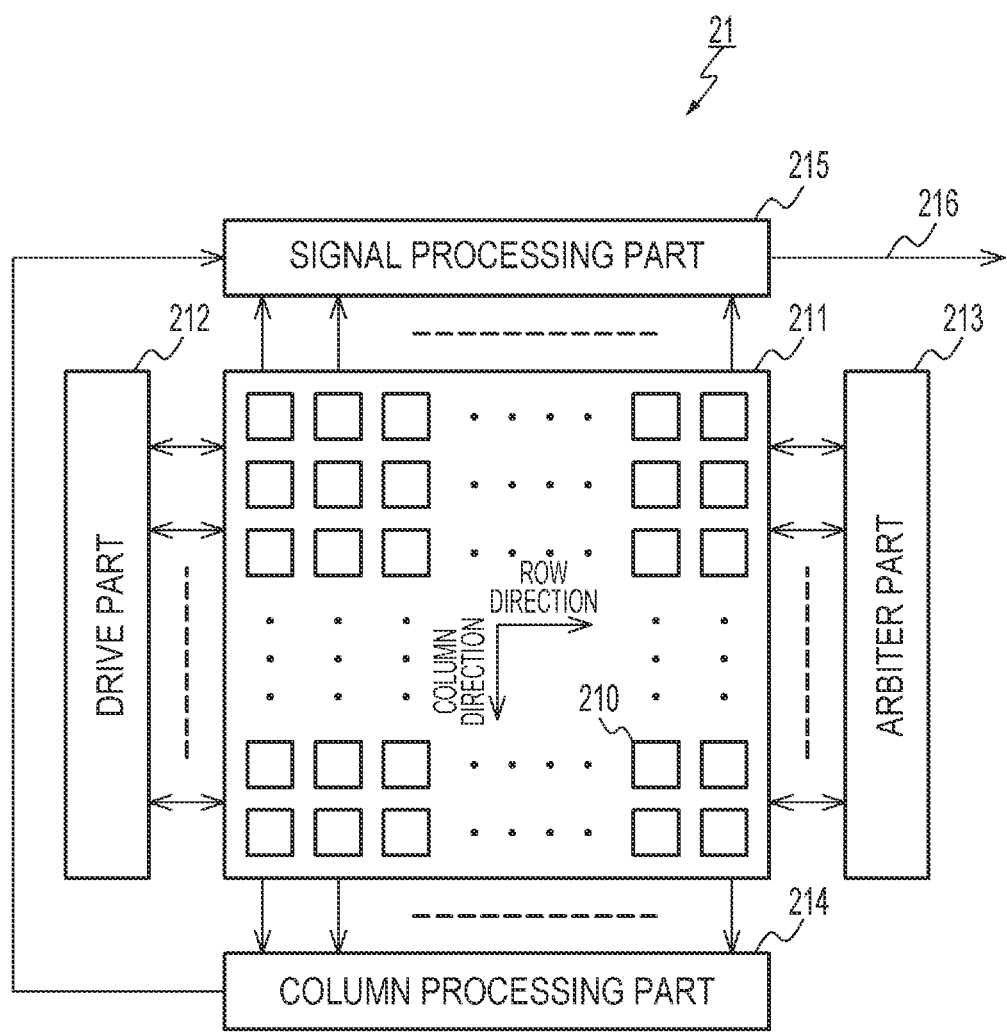
FIG. 5 is a block diagram illustrating an example of a configuration of an imaging part of the imaging device according to the first configuration example of the present disclosure.

A configuration example of the imaging part 21 including the imaging device 122 of the light receiving part 12 according to the first configuration example will be specifically described below. FIG. 5 is a block diagram illustrating an example of a configuration of the imaging part 21.

As illustrated in FIG. 5, the imaging part 21 according to the present configuration example uses an asynchronous imaging device called EVS, and includes a pixel array part 211, a drive part 212, an arbiter part 213, a column processing part 214, and a signal processing part 215.

1) Pixel Array Part

In the imaging part 21 having the above configuration, a plurality of pixels 210 is two-dimensionally arranged in a matrix (array) in the pixel array part 211. A vertical signal line VSL, which will be described later, is wired for each pixel column (column) to this matrix pixel array.

Each of the plurality of pixels 210 generates an analog signal of a voltage corresponding to a photocurrent as a pixel signal. Furthermore, each of the plurality of pixels 210 detects the presence or absence of an address event on the basis of whether or not a change amount of the photocurrent exceeds a predetermined threshold value. Then, in a case where an address event occurs, the pixel 210 outputs a request to the arbiter part 213.

2) Drive Part

The drive part 212 drives each of the plurality of pixels 210 to output a pixel signal generated in the pixel 210 to the column processing part 214.

3) Arbiter Part

The arbiter part 213 arbitrates a request from each of the plurality of pixels 210 and transmits a response based on a result of the arbitration to the pixel 210. The pixel 210 that has received the response from the arbiter part 213 supplies event data (a detection signal of an address event) indicating a detection result to the drive part 212 and the signal processing part 215. As for readout of the event data from the pixel 210, the event data may be read out from a plurality of rows.

4) Column Processing Part

The column processing part 214 includes, for example, an analog-digital converter or the like, and performs, for each pixel column of the pixel array part 211, processing such as processing of converting an analog pixel signal output from the pixels 210 of the column into a digital signal. Then, the column processing part 214 supplies the digital signal obtained after the analog-digital conversion to the signal processing part 215.

5) Signal Processing Part

The signal processing part 215 performs predetermined signal processing such as correlated double sampling (CDS) processing or image recognition processing on the digital signal supplied from the column processing part 214. Then, the signal processing part 215 outputs data indicating a result of the processing and the event data supplied from the arbiter part 213 over a signal line 216.

[Configuration Example of Pixel Array Part]

Figure 6:
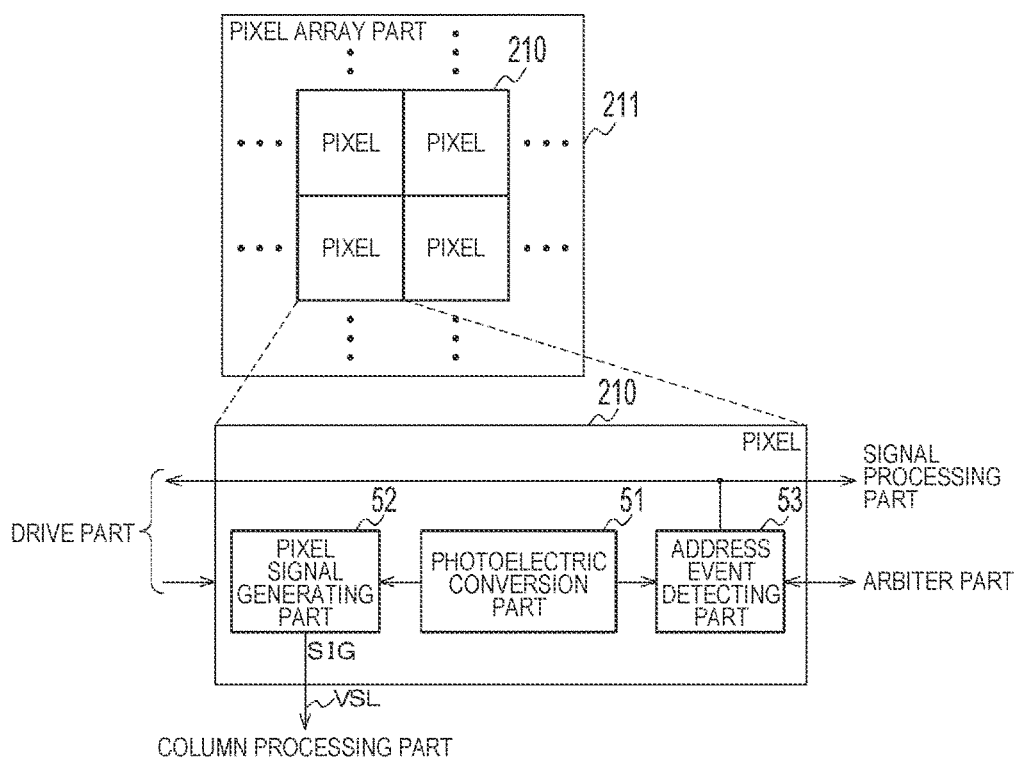
FIG. 6 is a block diagram illustrating an example of a configuration of a pixel array part of the imaging part according to the first configuration example of the present disclosure.

FIG. 6 is a block diagram illustrating an example of a configuration of the pixel array part 211.

In the pixel array part 211 in which the plurality of pixels 210 is two-dimensionally arranged in a matrix, each of the plurality of pixels 210 includes a photoelectric conversion part 51, a pixel signal generating part 52, and an address event detecting part 53.

1) Photoelectric Conversion Part

In the pixel 210 having the above configuration, the photoelectric conversion part 51 photoelectrically converts incident light to generate a photocurrent. Then, the photoelectric conversion part 51 supplies the photocurrent generated by the photoelectric conversion to either the pixel signal generating part 52 or the address event detecting part 53 under control of the drive part 212 (see FIG. 5).

2) Pixel Signal Generating Part

The pixel signal generating part 52 generates a signal of a voltage corresponding to the photocurrent supplied from the photoelectric conversion part 51 as a pixel signal SIG, and supplies the generated pixel signal SIG to the column processing part 214 (see FIG. 5) through the vertical signal line VSL.

3) Address Event Detecting Part

The address event detecting part 53 detects the presence or absence of occurrence of an address event (hereinafter sometimes referred to simply as an "event".) on the basis of whether or not a change amount of the photocurrent from the photoelectric conversion part 51 exceeds a predetermined threshold value. The address event includes, for example, an on-event indicating that the change amount of the photocurrent exceeds an upper limit threshold value and an off-event indicating that the change amount falls below a lower limit threshold value. Furthermore, a detection signal of the address event includes, for example, one bit indicating a detection result of the on-event and one bit indicating a detection result of the off-event. Note that the address event detecting part 53 can be configured to detect only an on-event.

When an address event occurs, the address event detecting part 53 supplies a request requesting transmission of a detection signal of the address event to the arbiter part 213 (see FIG. 5). Then, upon receipt of a response to the request from the arbiter part 213, the address event detecting part 53 supplies a detection signal (event data) of the address event to the drive part 212 and the signal processing part 215.

[Example of Circuit Configuration of Pixel]

Figure 7:
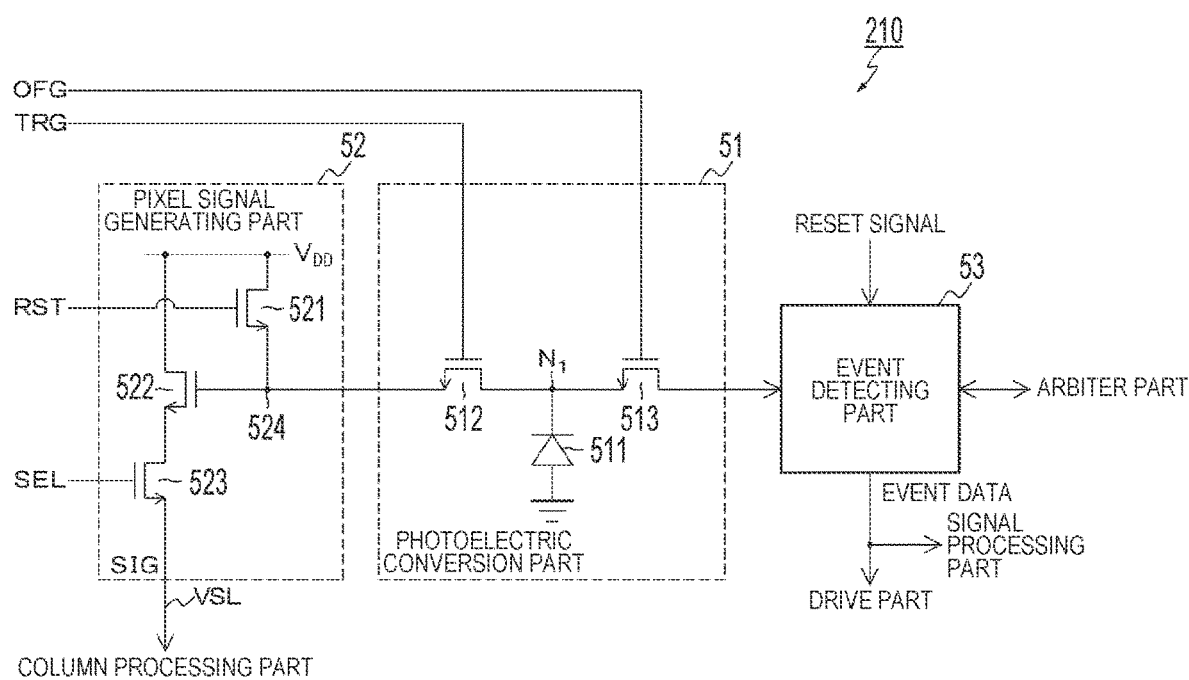
FIG. 7 is a circuit diagram illustrating an example of a circuit configuration of a pixel according to the first configuration example of the present disclosure.

FIG. 7 is a circuit diagram illustrating an example of a circuit configuration of the pixel 210. As described above, each of the plurality of pixels 210 includes the photoelectric conversion part 51, the pixel signal generating part 52, and the address event detecting part 53.

1) Photoelectric Conversion Part

In the pixel 210 having the above configuration, the photoelectric conversion part 51 includes a photoelectric conversion element (light receiving element) 511, a transfer transistor 512, and an over flow gate (OFG) transistor 513. As the transfer transistor 512 and the OFG transistor 513, for example, N-type metal oxide semiconductor (MOS) transistors can be used. The transfer transistor 512 and the OFG transistor 513 are connected in series to each other.

1-1) Photoelectric Converter

The photoelectric conversion element 511 is connected between a common connection node $N_1$ between the transfer transistor 512 and the OFG transistor 513 and the ground, and photoelectrically converts incident light to generate a charge of a charge amount corresponding to an amount of incident light.

1-2) Transfer Transistor

A transfer signal TRG is supplied from the drive part 212 illustrated in FIG. 5 to a gate electrode of the transfer transistor 512. In response to the transfer signal TRG, the transfer transistor 512 supplies the charge obtained by the photoelectric conversion by the photoelectric conversion element 511 to the pixel signal generating part 52.

1-3) OFG Transistor

A control signal OFG is supplied from the drive part 212 to a gate electrode of the OFG transistor 513. In response to the control signal OFG, the OFG transistor 513 supplies an electric signal generated by the photoelectric conversion element 511 to the address event detecting part 53. The electric signal supplied to the address event detecting part 53 is a photocurrent made up of charges.

2) Pixel Signal Generating Part

The pixel signal generating part 52 includes a reset transistor 521, an amplification transistor 522, a selection transistor 523, and a floating diffusion layer 524. As the reset transistor 521, the amplification transistor 522, and the selection transistor 523, for example, N-type MOS transistors can be used.

The charge obtained by the photoelectric conversion by the photoelectric conversion element 511 is supplied from the photoelectric conversion part 51 to the pixel signal generating part 52 by the transfer transistor 512. The charge supplied from the photoelectric conversion part 51 is accumulated in the floating diffusion layer 524. The floating diffusion layer 524 generates a voltage signal having a voltage value corresponding to an amount of accumulated charge. That is, the floating diffusion layer 524 converts the charge into a voltage.

2-1) Reset Transistor

The reset transistor 521 is connected between a power line of a power supply voltage $V_{DD}$ and the floating diffusion layer 524. A reset signal RST is supplied from the drive part 212 to a gate electrode of the reset transistor 521. In response to the reset signal RST, the reset transistor 521 initializes (resets) a charge amount of the floating diffusion layer 524.

2-2) Amplification Transistor

The amplification transistor 522 is connected in series with the selection transistor 523 between the power line of the power supply voltage $V_{DD}$ and the vertical signal line VSL. The amplification transistor 522 amplifies the voltage signal obtained by the charge-voltage conversion by the floating diffusion layer 524.

2-3) Selection Transistor

A selection signal SEL is supplied from the drive part 212 to a gate electrode of the selection transistor 523. In response to the selection signal SEL, the selection transistor 523 outputs, as the pixel signal SIG, the voltage signal amplified by the amplification transistor 522 to the column processing part 214 (see FIG. 5) through the vertical signal line VSL.

In the imaging part 21 including the pixel array part 211 in which the pixels 210 having the above configuration are two-dimensionally arranged, the drive part 212 supplies, upon instruction to start detection of an address event a light reception control part (not illustrated), the control signal OFG to the OFG transistor 513 of the photoelectric conversion part 51, thereby driving the OFG transistor 513 to supply photocurrent to the address event detecting part 53.

2-4) Floating Diffusion Layer

Then, upon detection of occurrence of an event in a certain pixel 210, the drive part 212 turns off the OFG transistor 513 of the pixel 210 and stops supplying photocurrent to the address event detecting part 53. Next, the drive part 212 drives the transfer transistor 512 by supplying the transfer signal TRG to the transfer transistor 512, and thereby causes the transfer transistor 512 to transfer a charge obtained by photoelectric conversion by the photoelectric conversion element 511 to the floating diffusion layer 524.

In this manner, the imaging part 21 including the pixel array part 211 in which the pixels 210 having the above configuration are two-dimensionally arranged outputs only a pixel signal of the pixel 210 in which occurrence of an event is detected to the column processing part 214. As a result, it is possible to reduce power consumption of the imaging part 21 and eventually reduce power consumption of the imaging device 122 and a processing amount of image processing as compared with a case where pixel signals of all pixels are output regardless of whether or not an event occurs.

Note that the configuration of the pixels 210 illustrated above is an example, and is not limited to this configuration example. For example, it is also possible to employ a pixel configuration that does not include the pixel signal generating part 52. In a case where this pixel configuration is employed, it is only required to omit the OFG transistor 513 in the photoelectric conversion part 51 and give the function of the OFG transistor 513 to the transfer transistor 512.

3) Address Event Detecting Part

Figure 8:
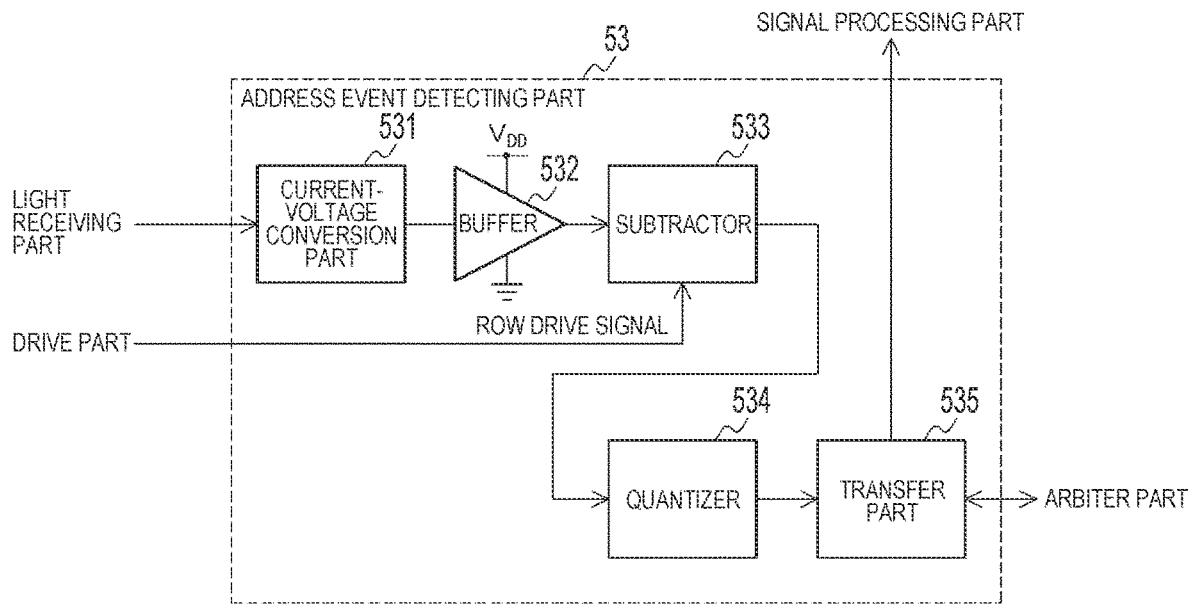
FIG. 8 is a block diagram illustrating an example of a configuration of an address even detecting part according to the first configuration example of the present disclosure.

FIG. 8 is a block diagram illustrating an example of a configuration of the address event detecting part 53. As illustrated in FIG. 8, the address event detecting part 53 according to the present configuration example includes a current-voltage conversion part 531, a buffer 532, a subtractor 533, a quantizer 534, and a transfer part 535.

3-1) Current-Voltage Conversion Part and Buffer

The current-voltage conversion part 531 converts photocurrent supplied from the photoelectric conversion part 51 of the pixel 210 into a voltage signal that is a logarithm thereof. The current-voltage conversion part 531 supplies the voltage signal obtained by the conversion to the buffer 532. The buffer 532 buffers the voltage signal supplied from the current-voltage conversion part 531 and supplies the voltage signal to the subtractor 533.

3-2) Subtractor and Quantizer

A row drive signal is supplied from the drive part 212 to the subtractor 533. The subtractor 533 lowers a level of the voltage signal supplied from the buffer 532 in accordance with the row drive signal. Then, the subtractor 533 supplies the voltage signal whose level has been lowered to the quantizer 534. The quantizer 534 quantizes the voltage signal supplied from the subtractor 533 into a digital signal and outputs the digital signal to the transfer part 535 as a detection signal (event data) of an address event.

3-3) Transfer Part

The transfer part 535 transfers the detection signal (event data) of the address event supplied from the quantizer 534, for example, to the arbiter part 213. Upon detection of occurrence of an event, the transfer part 535 supplies a request requesting transmission of a detection signal of an address event to the arbiter part 213. Then, upon receipt of a response to the request from the arbiter part 213, the transfer part 535 supplies a detection signal of the address event to the drive part 212 and the signal processing part 215.

[Shape Measurement Method (Measurement Principle) for Measuring Shape of Object to be Measured]

Next, a principle of shape measurement in the shape measuring device 10A of the first configuration example according to the shape measuring system of the second embodiment of the present disclosure will be described with reference to FIGS. 9 and 10.

In the first configuration example of the present disclosure, as described above, a three-dimensional shape of the object 100 to be measured (measurement surface 100A) is detected by using the single light source part 11A and the two light receiving parts 12 (that is, the light receiving parts 12A and 12B).

Figure 9:
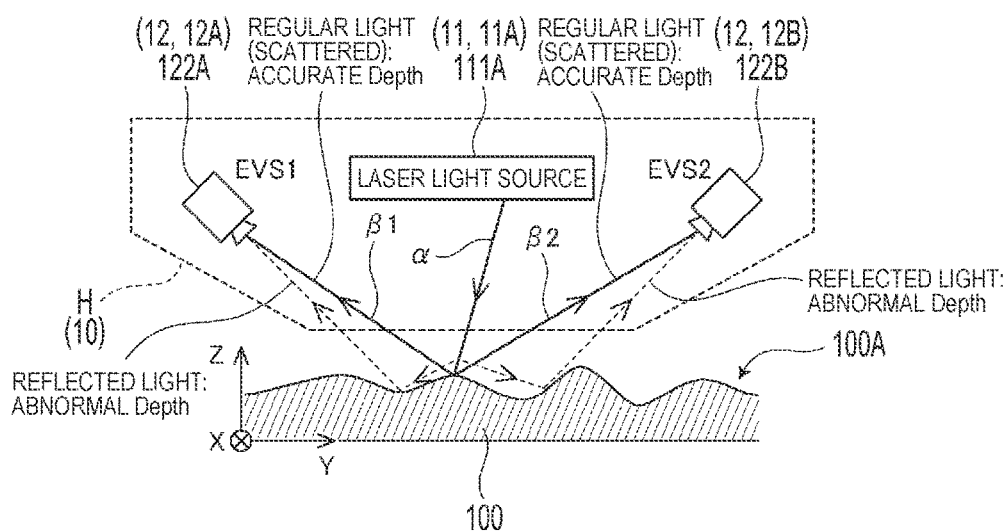
FIG. 9 is a principle diagram illustrating optical paths of incident light and reflected light on an object to be measured according to the first configuration example of the present disclosure.

A positional relationship of the light source part 11A and the light receiving parts 12 including the light receiving parts 12A and 12B is not particularly limited, but in the present configuration example, the light receiving parts 12A and 12B are arranged on both sides of the light source part 11A, as illustrated in FIG. 9. The light receiving parts 12A and 12B need not necessarily be symmetrically arranged with respect to the light source part 11A, and are preferably separated from each other as much as possible. Furthermore, the light source part 11A and the light receiving parts 12 may be arranged along the same YZ plane or need not be arranged on the same YZ plane.

The blue light from the semiconductor laser (LD), which is the light source 111 of the light source part 11A, is subjected to waveform processing by the cylindrical lens 112 illustrated in FIG. 3 to become line slit light parallel to the XZ plane, and is projected and emitted to the measurement surface 100A of the object 100 to be measured.

On the measurement surface 100A on which the line slit light is incident, the line slit light is scattered according to irregularities of the measurement surface 100A, and the scattered light passes through light receiving lenses of the light receiving parts 12A and 12B and enters EVS1 and EVS2, which are the imaging devices 122A and 122B.

There is a possibility that scattered light generated by being scattered on the measurement surface 100A is incident as reflected light on the EVS1 and EVS2, which are the imaging devices 122A and 122B. Therefore, in the present disclosure, among reflected light beams directed to the light receiving parts 12A and 12B after being scattered and reflected at respective positions during measurement on the measurement surface 100A, especially two beams of measurement light that enter the light receiving parts 12A and 12B provided at different positions by traveling different shortest optical paths become regular reflected light. Data obtained from the regular reflected light is used for shape measurement of the present disclosure.

Even for the object 100 to be measured of the present configuration example, there is a possibility that a secondary wave (secondary reflected light) enters the EVS1 and EVS2 (hereinafter sometimes referred to as "EVSs 1 and 2") which are the imaging devices 122, leading to a measurement (distance measurement) error. Therefore, from data obtained by measurement by the EVSs 1 and 2 at each time t, distances to the measurement surface 100A in the EVSs 1 and 2 and the like are calculated by using a predetermined arithmetic expression to be described later, data in which shapes obtained by the EVSs 1 and 2 coincide with each other is used as data obtained from the regular reflected light, and a cross-sectional shape of the object 100 to be measured is calculated from the regular reflected light by the following arithmetic expression to obtain a three-dimensional shape. This will be described in detail with reference to FIGS. 10 and 11.

Note that the arithmetic expressions used here are as follows, and especially a shape at each point (X, Y, Z) of the measurement surface 100A can be calculated from these arithmetic expressions.

$X$=an $X$ coordinate at a point in the depth direction $\quad$ (1)

$Y$=(a scanning speed of the scan mechanism)·(an operation time of the scan mechanism)−(a distance measurement error $\Delta y$ in the $Y$ direction) $\quad$ (2)

$Z$=(the distance measurement error $\Delta y$ in the $Y$ direction)/(tan $\theta$) $\quad$ (3)

where $\theta$ is an inclination angle of the light source with respect to a perpendicular line.

Here, derivation of the expression (3) will be described with reference to the drawings.

Figure 11:
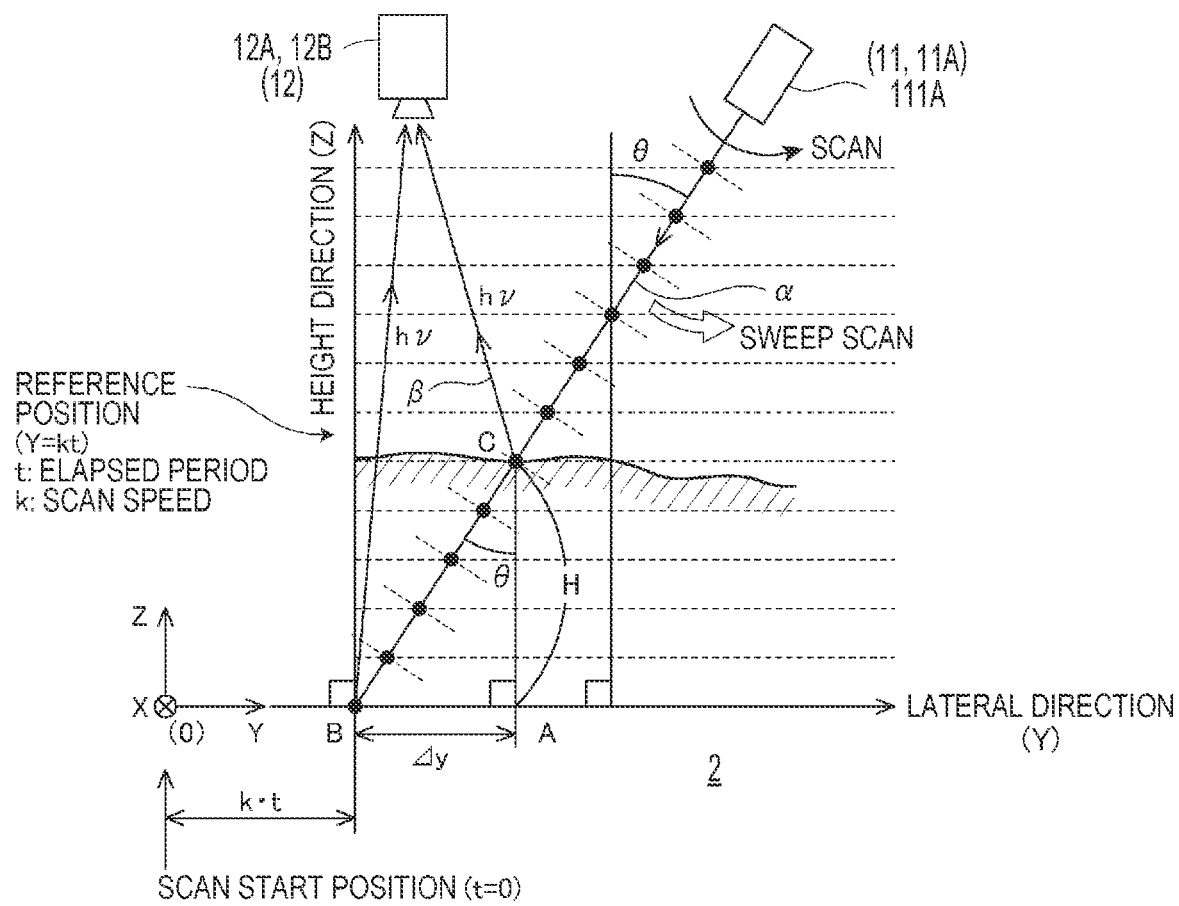
FIG. 11 is an explanatory view for deriving an arithmetic expression for calculating the height of the object to be measured according to the first configuration example of the present disclosure.

FIG. 11 illustrates an optical path of laser light oscillated from the LD which is the light source 111 emitted from the light source 122. Since the laser light is coherent light, portions of same specific phases (wavefronts) on an optical path of the laser light are sequentially indicated by thick black circles and inclined broken lines to facilitate understanding of the description. Furthermore, level lines are indicated by the broken lines in order to clarify heights from the stage 2. Note that the measurement light used in the present configuration example of the present disclosure need not necessarily use and detect, for example, a change in phase, and thus may be incoherent light.

In FIG. 11, assuming that coordinates of a bottom part immediately below a surface point C of certain slit light on the measurement surface 100A are A=(X0, Ya, Z0), coordinates of a bottom part B facing the stage 2 are B=(X0, Yb, Z0), and coordinates of the point C on the surface at a height H to be measured from the stage 2 are C=(X0, Ya, Za), the following expression is established in a triangle ABC regarding a distance measurement error $\Delta y$, which is a deviation in the lateral (Y) direction of the regular reflected light from the points B and C:

$$\tan \theta = \Delta y/H \qquad (4)$$

(where H is a thickness of the object 100 to be measured). The height H=$\Delta y$/tan θ to be obtained, that is, the expression (3) is derived from the expression (4). Therefore, the three-dimensional coordinates (X0, Ya, Za) of the point C including data in the thickness direction of the measurement surface 100A are obtained by the expressions (1) to (3). Note that the X coordinate of the point C is X=0, but is not particularly limited to this coordinate position only. Any position coordinate in the X direction can be applied as for the object 100 to be measured on the stage 2.

Note that, as a method obtaining three-dimensional data in the present configuration example, for example, a configuration of generating a three-dimensional shape by discriminating and extracting regular reflected light while excluding secondary reflected light from a phase difference or a difference in polarization plane may be adopted instead of the above method. A configuration example using a polarization plane will be described in detail later.

Therefore, a plane wave (or a spherical wave) reaching the measurement surface 100A of the object 100 to be measured differs in transmission time t of the plane wave to the light receiving part depending on a height position of the measurement surface 100A (also differs in phase difference or the like). As a result, the distance measurement error $\Delta y$ included in the arithmetic expressions (2) and (3) described above is generated. Therefore, the height H of the object to be measured can be calculated from the time t and the distance measurement error $\Delta y$. Note that, although details are omitted in the present disclosure, a temporal difference may also be generated in intensity E of an electric field reaching the imaging device 122, an accumulated charge amount, and the like. For example, the height of the object 100 to be measured may be measured by using a difference in luminance or a difference in accumulated charge amount of each pixel.

[Action and Effect of Present Configuration Example]

Figure 12:
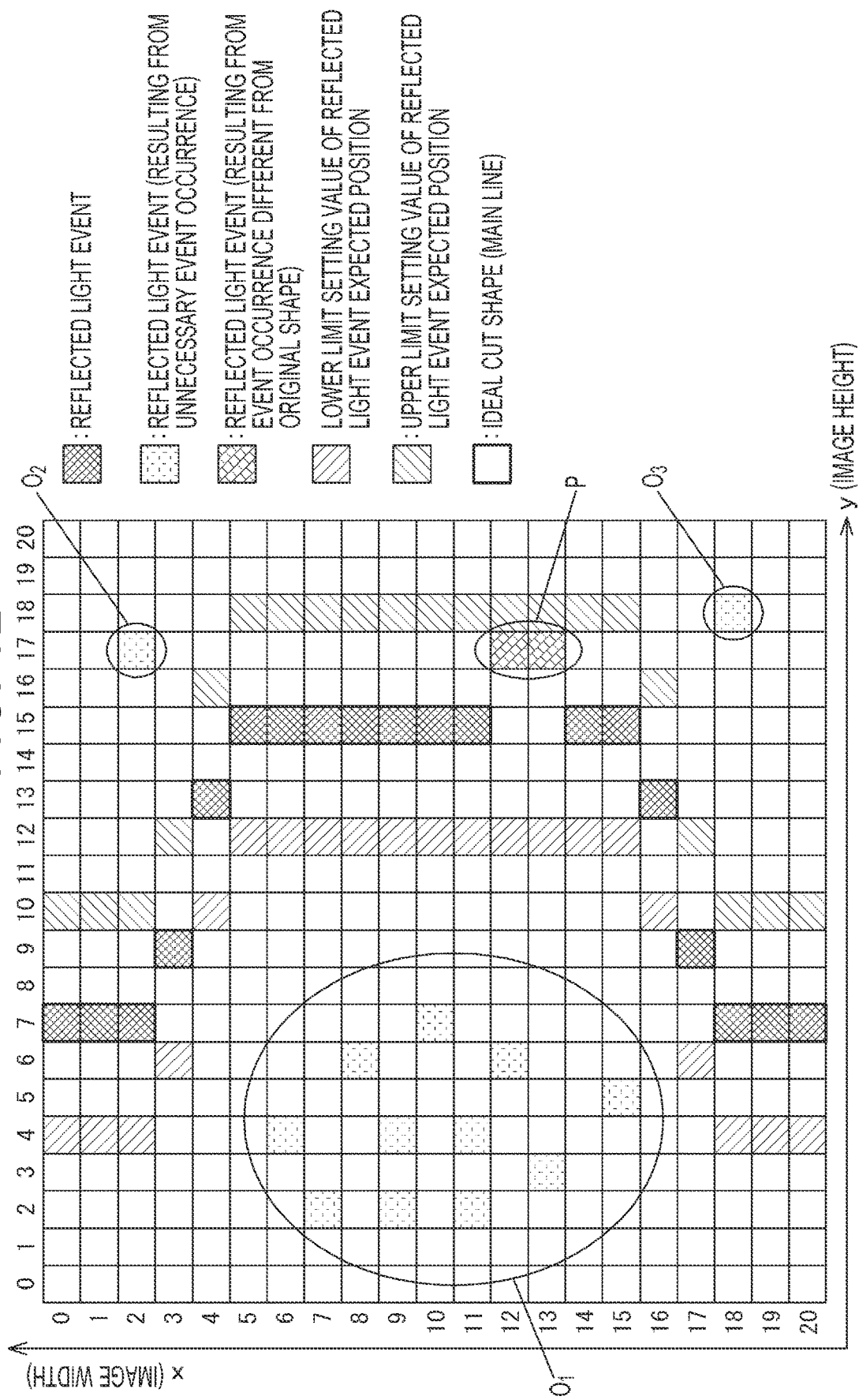
FIG. 12 is a conceptual diagram illustrating a distribution of generation of a reflected light event according to the first configuration example of the present disclosure.

Therefore, according to the present configuration example, in the EVSs 1 and 2, which are the two imaging devices 122A and 122B, detection signals that give the same shape (height H) are output from both the EVSs 1 and 2 not only from a point where a shape change is small, but also from a point where the shape (unevenness) change is large by receiving the regular reflected light (scattered light). FIG. 12 is a schematic diagram illustrating an output distribution of event data of each pixel at a certain time t1. In FIG. 12, it can be determined that the left half area and the right half area are completely different in output state of event data.

However, in a case where a single EVS is provided (it is also assumed that a single light source is provided), it is not possible to determine which is output of event data generated by a regular signal based on a regular reflected light.

In the present configuration example, the two imaging devices 122 are used. At a certain point at a certain time t, in a case where regular reflected light is captured, a height of a convex portion (or a depth of a concave portion) at the point obtained from both EVSs 1 and 2 should be uniquely determined regardless of which of the EVSs 1 and 2 captures the reflected light. That is, it is physically impossible that the height H at the same point has a plurality of values. The event data at the same point obtained from both EVSs 1 and 2 should be the same, and reflected light that gives a unique input signal value in both EVSs 1 and 2 is regular reflected light.

In view of this, in the present embodiment, as described above, calculation based on data obtained from the regular reflected light is performed by using the above arithmetic expressions. Therefore, accurate shape measurement can be performed even at a point where an irregularity difference is large. Furthermore, since EVS is used as the imaging devices 122A and 122B, it is possible to capture a three-dimensional image at high speed.

As described above, according to the present configuration example, measurement light that travels on a shortest optical path is used as measurement light traveling from the light source 111 in the light source part 11A toward the object 100 to be measured, and two beams of measurement light (regular reflected light) that are reflected and scattered at a same point (same position) and travel on shortest optical paths different from each other can be used as measurement light traveling toward the light receiving part 12 after the measurement light is scattered and reflected at a specific position of the measurement surface 100A which is a measurement point of the object 100 to be measured at each time. Therefore, even if multipath reflected light (that is, secondary reflected light) is mixed in the reflected light and the secondary reflected light is incident on the light receiving part 12, a measurement surface shape of the object 100 to be measured can be accurately measured by using the two beams of regular reflected light having the characteristics described above. In particular, even if the shape has large irregularities, calculation can be performed with high accuracy by the arithmetic expressions (1) to (3) described above.

(2-2. Second Configuration Example)

Figure 13:
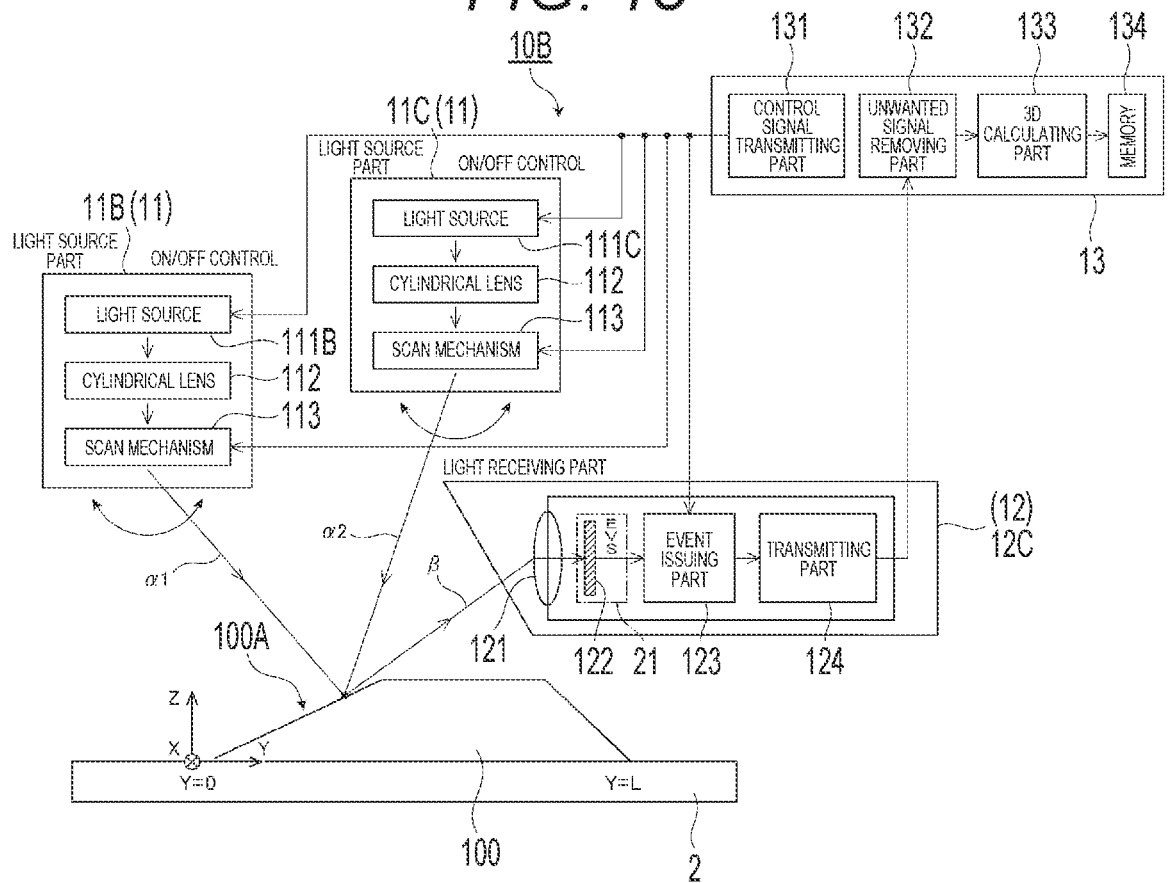
FIG. 13 is a configuration block diagram illustrating a shape measuring system according to a second configuration example of the present disclosure.
Figure 14:
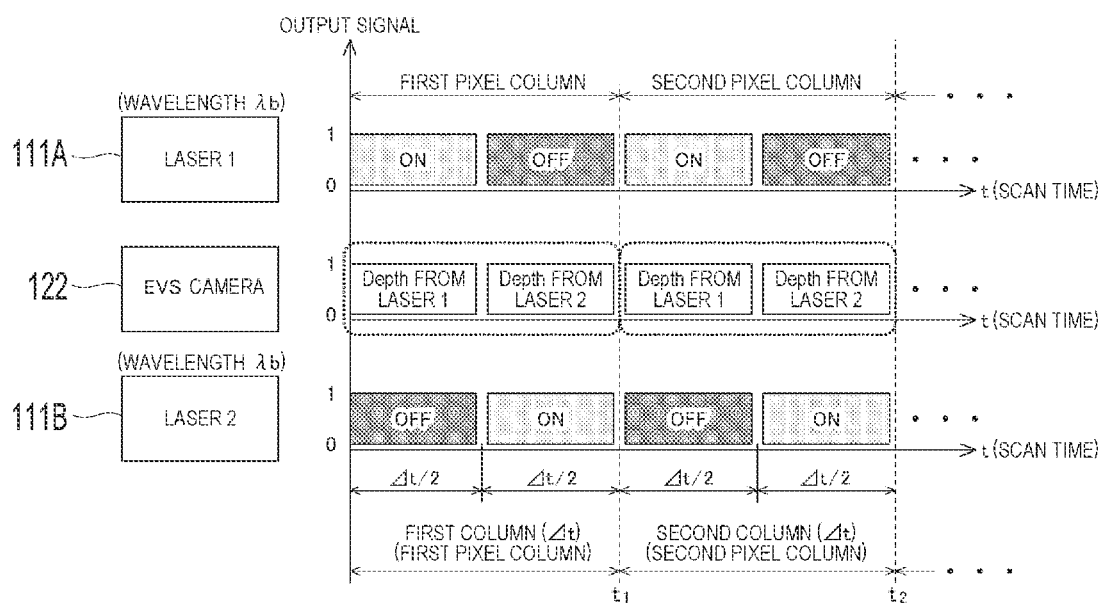
FIG. 14 is a timing chart illustrating operations of a light source part and a light receiving part of the shape measuring system according to the second configuration example of the present disclosure.

Next, a shape measuring device 10B of a second aspect (hereinafter referred to as a "second configuration example") according to the shape measuring system of the second embodiment of the present disclosure will be described with reference to FIGS. 13 and 14. Note that same parts as those of the first configuration example are given same reference signs, and repeated description thereof is avoided.

The present configuration example is different from the first configuration example described above in that two light source parts 11, specifically, a first light source part 11B and a second light source part 11C are used and a single light receiving part 12 (hereinafter referred to as a light receiving part 12C) is used. It is preferable that the two light source parts, specifically, the first light source part 11B and the second light source part 11C be installed apart from each other. For example, the two light source parts, specifically, the first light source part 11B and the second light source part 11C can be installed at positions opposite to each other in the lateral (Y) direction relative to the light receiving part 12. The two light source parts, specifically, the first light source part 11B and the second light source part 11C need not necessarily disposed symmetrically about the light receiving part 12. Moreover, in the present configuration example, control of a control signal transmitting part 131 of a signal processing unit 13 is also different.

The first light source part 11B can use, as a light source, a first semiconductor laser (LD1) 111B that continuously oscillates blue laser light having a blue wavelength ($\lambda$b). The second light source part 11C can also use, as a light source, a second semiconductor laser (LD2) 111C having the same wavelength ($\lambda$b) as the first semiconductor laser (LD1) 111B. As will be described in detail later, the first semiconductor laser (LD1) 111B can perform oscillation by being driven in time division with the second semiconductor laser (LD2) 111C in accordance with a control signal from the control signal transmitting part 131.

In the first light source part 11B and the second light source part 11C, a cylindrical lens 112 and a scan mechanism 113 can also have the same configurations as those of the first configuration example.

Also in each of the light source parts 11B and 11C of the present configuration example, sweep scanning is sequentially performed on an object 100 to be measured in the lateral (Y) direction. However, in the present configuration example, slit light is sequentially projected to an entire width in the depth (X) direction of each pixel column (column) for one half of two divided time intervals. Specifically, as illustrated in FIG. 14, when slit light is projected to each pixel column (column) for a time interval $\Delta t$, blue laser light having a specific wavelength ($\lambda$b) is emitted from the first light source part 11B for $\Delta t/2$ seconds under control of the control signal transmitting part 131. Thereafter, blue laser light having the same wavelength ($\lambda$b) is continuously emitted from the second light source part 11C for $\Delta t/2$ seconds. These beams of blue laser light are projected to the object 100 to be measured from the light sources 111B and 111C disposed at different positions.

Meanwhile, the single light receiving part 12C is provided, and the light receiving part 12C uses, as an imaging device 122, an asynchronous type as in the first configuration example. That is, an event-based vision sensor (EVS) having a configuration in which pixels that photoelectrically convert incident light reflected by the object 100 to be measured are two-dimensionally arranged in a matrix is used. In this EVS, for each pixel column (column), reflected light from the measurement surface of the object 100 to be measured is sequentially captured into each pixel constituting the pixel column, as in the first configuration example. Then, based on the captured reflected light, each pixel constituting each pixel column (column) generates a photoelectric conversion signal by photoelectric conversion. The photoelectric conversion signal is output to an event issuing part 123.

[Operation and Effect]

Therefore, according to the present configuration example, a driving time for the first and second semiconductor lasers 111B and 111C is equally divided into two. That is, in the present configuration example, slit light is projected to each pixel column (column) two times in total, specifically, laser light from the first semiconductor laser is projected once, and then laser light from the second semiconductor laser is projected once. These beams of laser light are sequentially emitted repeatedly in a cyclic manner from a start point (Y=0; an origin O) of the object 100 to be measured in the lateral (Y) direction to a final point (Y=L where L is an entire length of the object 100 to be measured in the lateral direction) in the lateral direction.

Therefore, according to the present configuration example, in the light receiving part 12, reflected light from the first and second light sources 11B and 11C is sequentially incident on the EVS 122 through the lens 121 in each pixel column (column). At this time, there is a possibility that secondary reflected light is also input from each light source in addition to the regular reflected light. Therefore, an electric signal related to the secondary reflected light is removed from an electric signal output to the signal processing unit 13 by an unwanted signal removing part 132, as in the first configuration example.

Also in the second configuration example according to the present disclosure, beams of reflected light that travel on shortest paths toward the light receiving part 12 among beams of reflected light (scattered light) emitted from the light source parts 11B and 11C and reflected by the measurement surface 100A of the object 100 to be measured enter the light receiving part 12 as two beams of regular reflected light, as described above. Furthermore, there may be reflected light (secondary reflected light) that is reflected and scattered by the measurement surface 100A and then, for example, is reflected by another portion and enters the light receiving part 12 while traveling another optical path. Even if such secondary reflected light is incident, according to the present configuration example, data obtained from the two beams of regular reflected light is unique, and therefore an unwanted signal related to the secondary reflected light that generates data different from these data can be removed later by the unwanted signal removing part 132, as in the first configuration example.

As a result, only regular electric signals resulting from the beams of regular reflected light of the laser light are input to the 3D calculating part 133. In the 3D calculating part 133, a value that is supposed to give a same height (Z or a same H depth) is obtained from these regular electric signals by using the arithmetic expressions described above together with data in the depth (X) direction on the measurement surface 100A of the object 100 to be measured. Such scanning is swept from a start point (Y=0) to an end point (Y=L) in the lateral (Y) direction of the object 100 to be measured. As a result, an accurate three-dimensional shape of the object 100 to be measured can be obtained.

Therefore, according to the present configuration example, an EVS is used as the imaging device 122, and an accurate three-dimensional shape can be detected at high speed even for the object 100 to be measured having a large irregularity difference, as in the first configuration example.

(2-3. Third Configuration Example)

Figure 15:
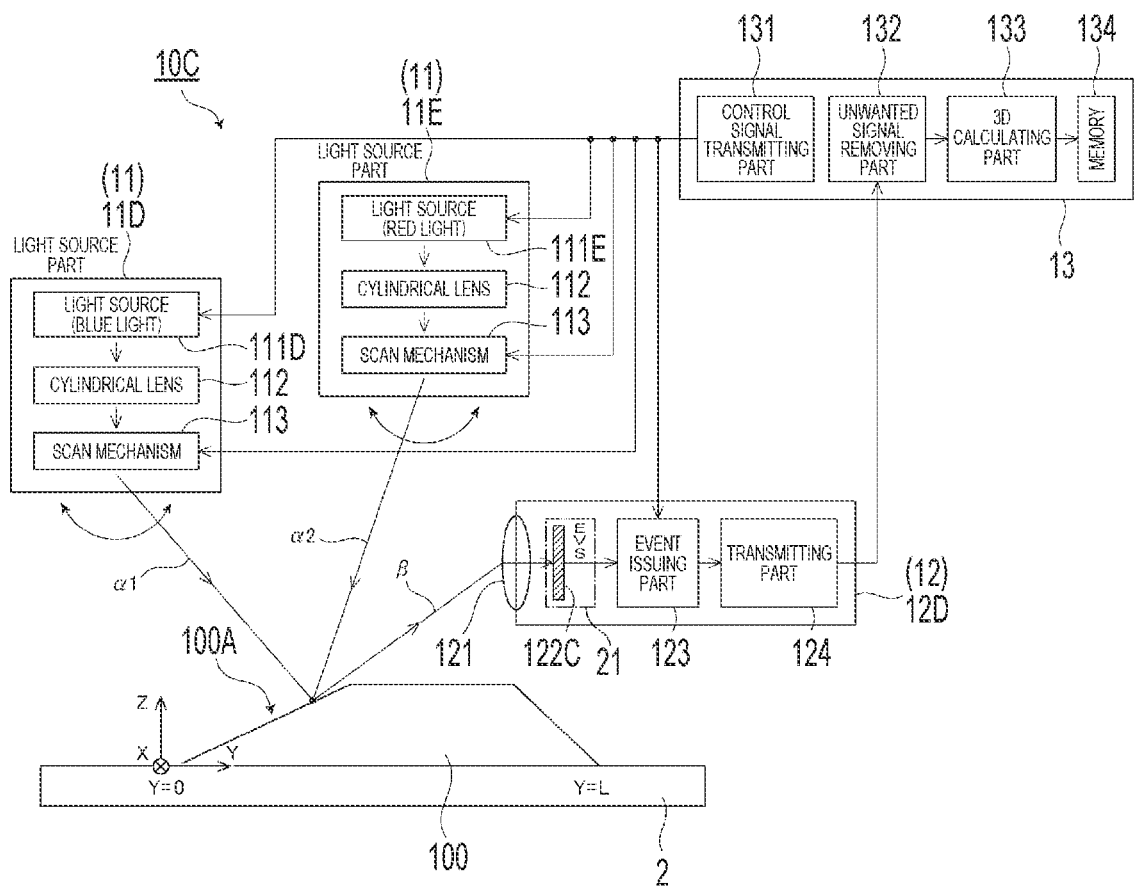
FIG. 15 is a configuration block diagram illustrating a shape measuring system according to a third configuration example of the present disclosure.
Figure 16:
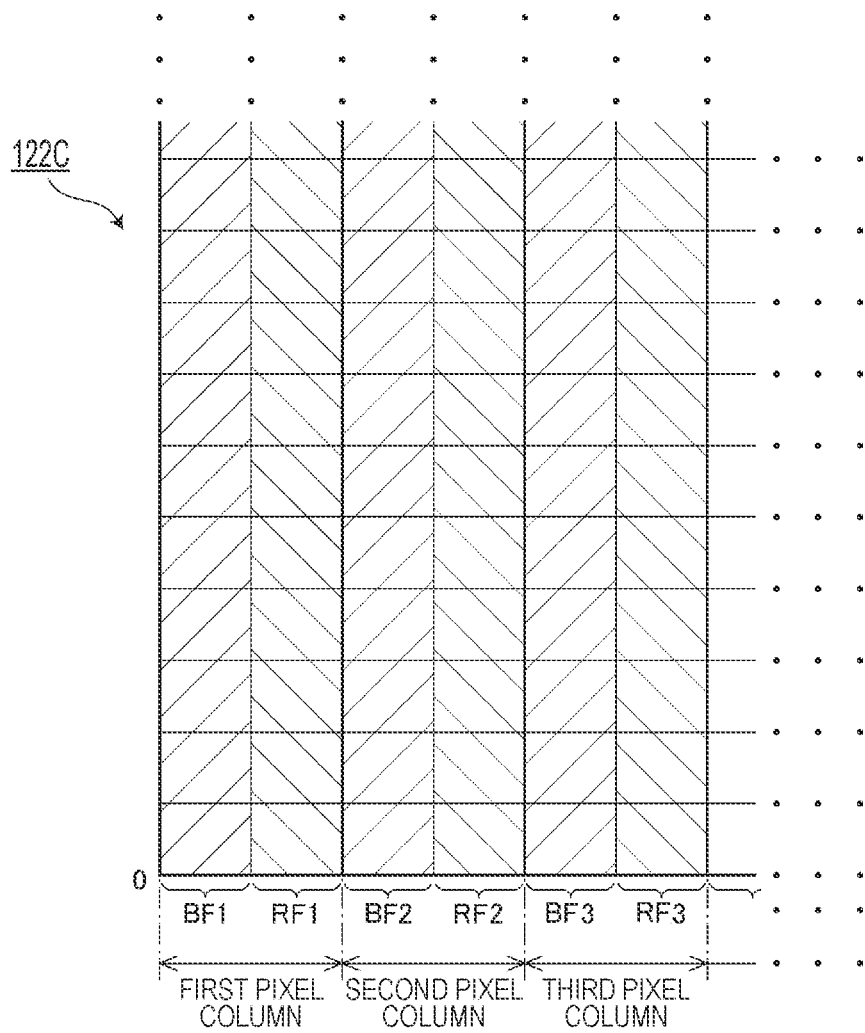
FIG. 16 is a configuration block diagram illustrating each pixel column of an EVS of the shape measuring system according to the third configuration example of the present disclosure.

Next, a shape measuring device 10C of a third aspect (hereinafter referred to as a "third configuration example") according to the shape measuring system of the second embodiment of the present disclosure will be described with reference to FIGS. 15 and 16. Note that, also in the present configuration example, same parts as those of the above configuration examples are given same reference signs, and repeated description thereof is avoided.

Although two light source parts, specifically, a first light source part 11D and a second light source part 11E are used as in the second configuration example, the configuration example of the present disclosure is different from the second configuration example in that light beams having different wavelengths are emitted from the first light source part 11D and the second light source part 11E. Moreover, also in the present configuration example, laser oscillation operations of light sources are controlled in a time division manner by a control signal transmitting part 131 in a signal processing unit 13, as in the second configuration example.

The first light source part 11D uses, as a light source, a first semiconductor laser (LD1) 111D that continuously oscillates blue laser light having a blue wavelength ($\lambda b$). On the other hand, the second light source part 11E uses, as a light source, a second semiconductor laser (LD2) 111E that continuously oscillates red laser light having a red wavelength ($\lambda r$; $\lambda r > \lambda b$).

Note that, as the light sources 111D and 111E used in the first and second light source parts 11D and 11E, light sources (for example, white LD) having wavelength in a same wide band width can also be used. In this case, measurement light of two colors may be generated by arranging different color filters on respective optical paths. Furthermore, for example, semiconductor lasers whose wavelengths ($\lambda$) can be converted may be used, and beams of laser light may be distinguished by converting the wavelengths ($\lambda$). Furthermore, beams of laser light may be distinguished by non-linear frequency ($\omega$) conversion means such as second harmonic generation (SHG) or sum frequency generation (SFG).

Also in the first and second light source parts 11D and 11E of the present configuration example, when sweep scanning is sequentially performed in the horizontal (Y) direction on an object 100 to be measured, in a case where light is projected to each pixel column (column) for a scanning time interval of $\Delta t$ seconds, each pixel column (column) is first irradiated with blue laser light from the first light source part 11D for $\Delta t/2$ seconds, as in the above configuration example. Immediately thereafter, red laser light is continuously emitted from the second light source part 11E for $\Delta t/2$ seconds. Thereafter, a similar scanning operation is sequentially repeated corresponding to each pixel column.

On the other hand, a single light receiving part 12D is provided, and an event-based vision sensor (EVS) similar to that of the second configuration example is used as an imaging device 122. However, in the EVS of the present configuration example, an area corresponding to each pixel column is divided into two corresponding to the operation time interval of each semiconductor laser. As illustrated in FIG. 16, a blue filter BF1, BF2, BF3, . . . is provided as a first filter that absorbs light of wavelengths other than blue and transmits only blue light in a first divided area (this area may be referred to as a "blue area"), which is a former half of an area portion corresponding to pixels of each pixel column. Similarly, a red filter RF1, RF2, RF3, . . . is provided as a second filter that transmits only red light and absorbs remaining light in a second divided area (this area may be referred to as a "red area"), which is a latter half of each pixel column. With such a configuration, only the blue laser light from the first semiconductor laser 111D and the red laser light from the second semiconductor laser 111E can be separately incident on the former half and the latter half areas (the blue area and the red area) of pixels of each pixel column, respectively.

[Action and Effect]

Therefore, according to the present configuration example, a driving time for the first and second semiconductor lasers 111D and 111E is equally divided into two. That is, in the present configuration example, blue slit light and red slit light are projected to each column (column) in this order. Such two colors of laser light are sequentially emitted repeatedly in a cyclic manner from a start point (Y=0; an origin O) of the object 100 to be measured in the lateral (Y) direction to a final point (Y=L where L is an entire length of the object 100 to be measured in the lateral direction) in the lateral direction.

In particular, in the present configuration example, only the blue laser light from the first semiconductor laser 111D and the red laser light from the second semiconductor laser 111E can be allowed to be incident on the former half and the latter half areas (the blue area and the red area) in pixels of each pixel column, respectively. Therefore, in the light receiving part 12, even if the reflected light of the blue light and the reflected light of the red light are mixed into a color such as purple and enter each pixel column (column) of the single EVS 122 through a lens 121, unnecessary wavelength light is removed by the color filters, that is, the blue filter BF1, BF2, BF3, . . . which is the first filter, and the red filter RF1, RF2, RF3, . . . , which is the second filter. As a result, only laser light having a desired wavelength can be sequentially incident on each predetermined area. At this time, even if laser light of a same color is selectively incident on each color area in each pixel, there is a possibility that secondary reflected light of the allowed same color is simultaneously input. Therefore, even if such secondary reflected light of the same color enters an area of the same color, an electric signal of the secondary reflected light related to laser light of the same color can be removed from an electric signal obtained by photoelectric conversion to be output from the EVS to the signal processing unit 13 by an unwanted signal removing part 132.

Furthermore, also in the third configuration example according to the present disclosure, beams of reflected light that travel on shortest paths toward the light receiving part 12 among beams of reflected light (scattered light) emitted from the light source parts 11D and 11E and reflected by the measurement surface 100A of the object 100 to be measured enter the light receiving part 12D as two kinds of regular reflected light, as in the second configuration example. Meanwhile, also in the present configuration example, there may be reflected light (secondary reflected light) that enters the light receiving part 12D, for example, by being reflected by another optical path or the like after being reflected and scattered by the measurement surface 100A. Even if such secondary reflected light is incident, according to the present configuration example, an unwanted signal caused by the secondary reflected light can be removed by the unwanted signal removing part 132, as in the second configuration example.

Therefore, the 3D calculating part 133 that receives only regular electric signals related to the laser light of the two colors calculates a three-dimensional shape from the two types of regular electric signals by using the arithmetic expressions described above. A value that gives a same height (H; or a same depth) on the measurement surface 100A of the object 100 to be measured is obtained from any one of the beams of laser light in a same pixel column (column). By sweep scanning such an operation from the start point (Y=0) to the end point (Y=L) in the lateral direction of the object 100 to be measured, an accurate three-dimensional shape can be obtained for the object 100 to be measured.

Therefore, according to the present configuration example, an accurate three-dimensional shape can be detected at high speed even for the object 100 to be measured having a large irregularity difference by using an EVS as the imaging device 122C, as in the first and second configuration examples.

Moreover, the EVS of the present configuration example is configured such that beams of laser light having different wavelengths are incident on two respective divided designated areas corresponding to the beams of light of the wavelengths in each pixel column. Therefore, for example, even if light of a color such as purple in which red light is mixed in blue light enters, as ambient light, a predetermined area of a certain pixel column of the EVS where the blue filter BF is provided, the light is blocked by the blue filter BF. Therefore, only reflected light from the blue laser light can be incident on the predetermined area of the pixel column. Furthermore, the same applies to a pixel column where the red filter RF is provided. This makes it possible to accurately measure a three-dimensional shape.

(2-4. Fourth Configuration Example)

Figure 17:
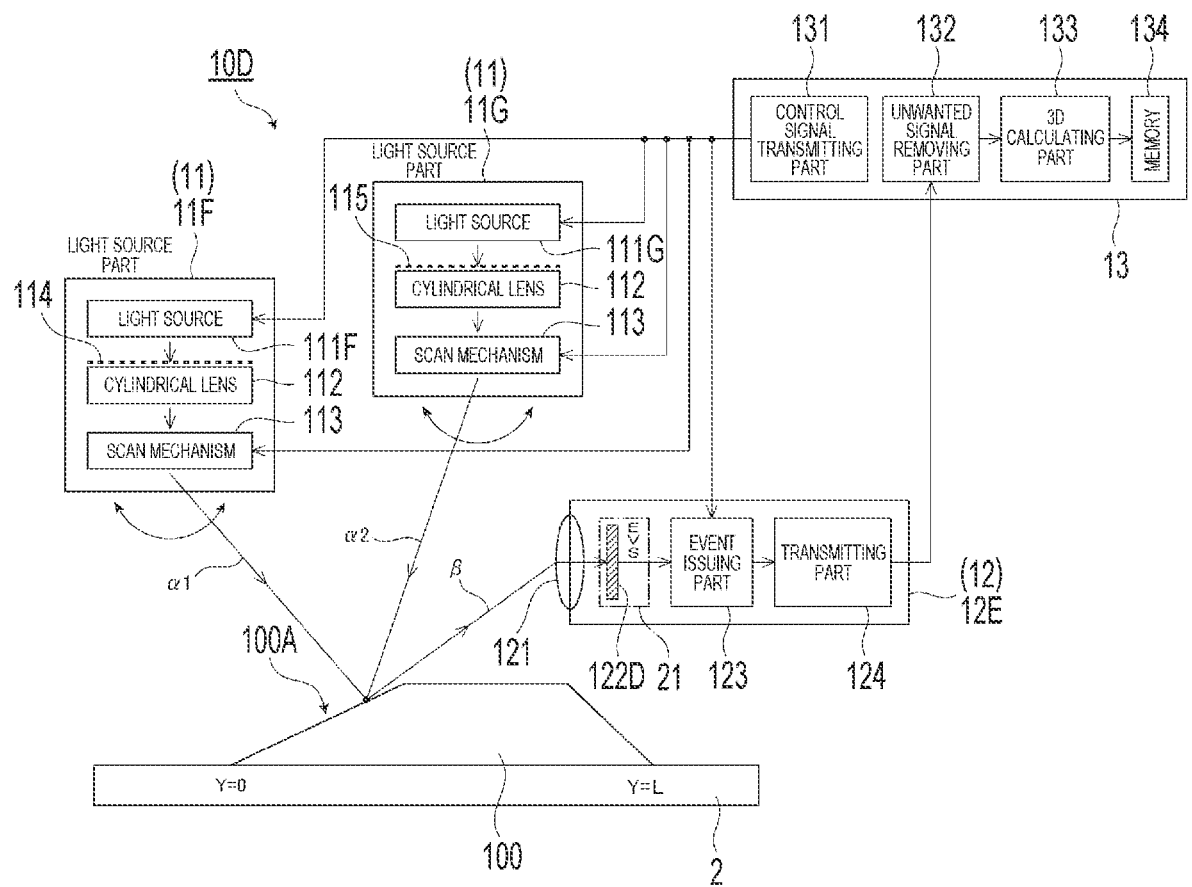
FIG. 17 is a configuration block diagram illustrating a shape measuring system according to a fourth configuration example of the present disclosure.
Figure 18:
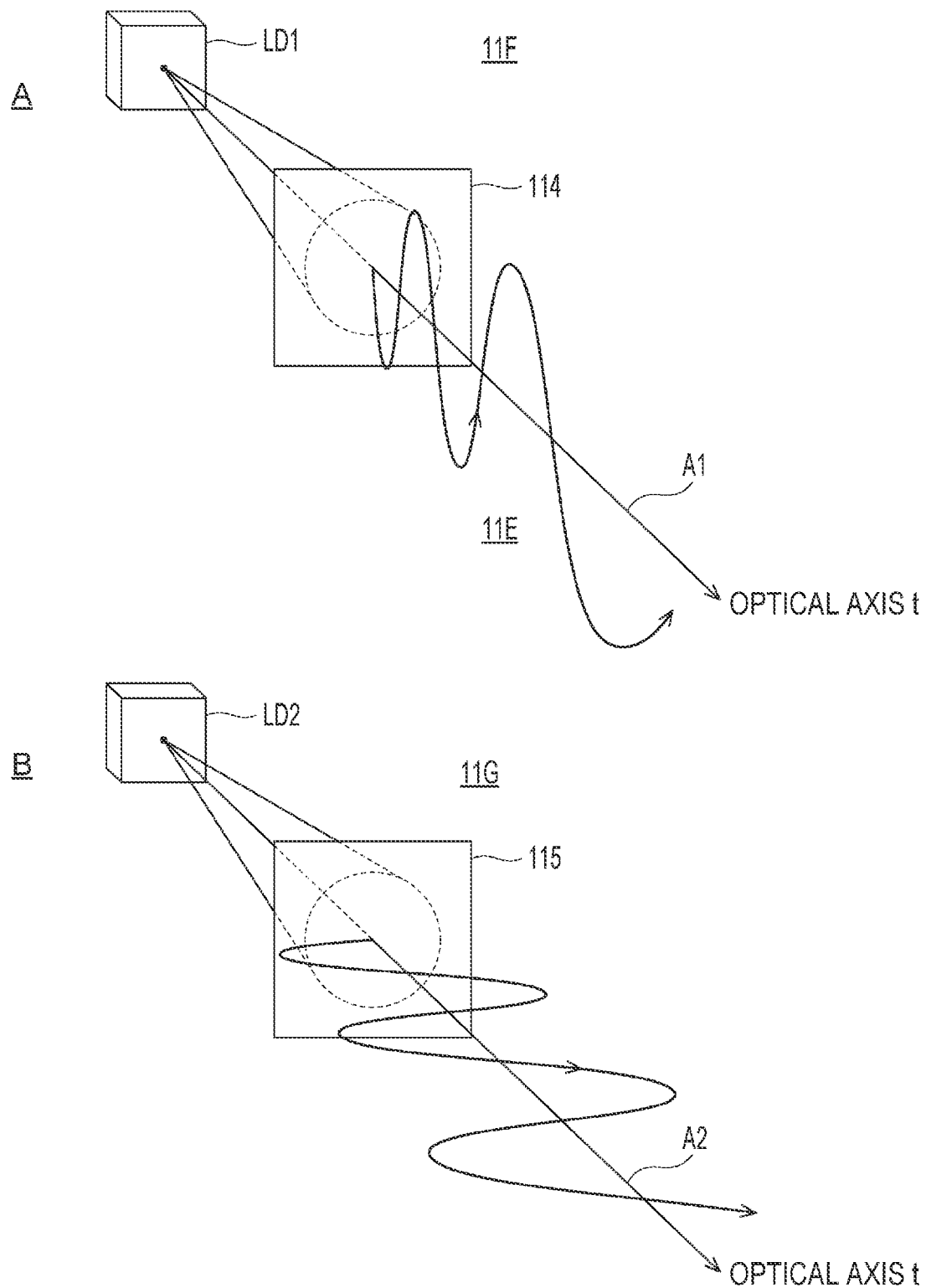
FIGS. 18A and 18B are optical path diagrams illustrating functions of a first polarizer and a second polarizer of the shape measuring system according to the fourth configuration example of the present disclosure.

Next, a shape measuring device 10D of a fourth aspect (hereinafter referred to as a "fourth configuration example") according to the shape measuring system of the second embodiment of the present disclosure will be described with reference to FIGS. 17 to 19. Note that, also in the present configuration example, same parts as those of the above configuration examples are given same reference signs, and repeated description thereof is avoided.

The present configuration example is different from the third configuration example in that semiconductor lasers LD1 and LD2 that emit beams of laser light of a same wavelength (λ) are used as light sources 111F and 111G of a first light source part 11F and a second light source part 11G, respectively. Furthermore, unlike the third configuration example, polarizers 114 and 115 having different predetermined functions are attached to the first light source part 11F and the second light source part 11G, respectively. Note that completely different types of LDs that emit beams of laser light having different wavelengths instead of the same wavelength can be used as the LD1 and the LD2.

[First and Second Light Source Parts]

The semiconductor laser LD1 oscillates and emits substantially circularly polarized (or elliptically polarized) laser light having a specific wavelength (λ) LD2 oscillates and emits substantially circularly polarized (or elliptically polarized) laser light having a similar wavelength to the semiconductor laser LD1. The wavelength of the laser light emitted from these lasers is not particularly limited, and any wavelength can be selected.

In the first light source part 11F, in order to emit vertically polarized laser light, the first polarizer 114 is provided on an optical path (optical axis A1) immediately following the LD1 illustrated in FIG. 18A, and thereby a polarization plane is shaped from circularly polarized light (or elliptically polarized light) to vertically polarized light (hereinafter sometimes referred to as a "P wave"), unlike the third configuration example. Similarly, in the second light source part 11G, in order to emit horizontally polarized laser light, the second polarizer 115 is provided on an optical path (optical axis A2) immediately following the LD2 illustrated in FIG. 18B, and thereby a polarization plane is shaped from circularly polarized light (or elliptically polarized light) to horizontally polarized light (hereinafter sometimes referred to as an "S wave"), unlike the third configuration example.

[Light Receiving Part]

Figure 19:
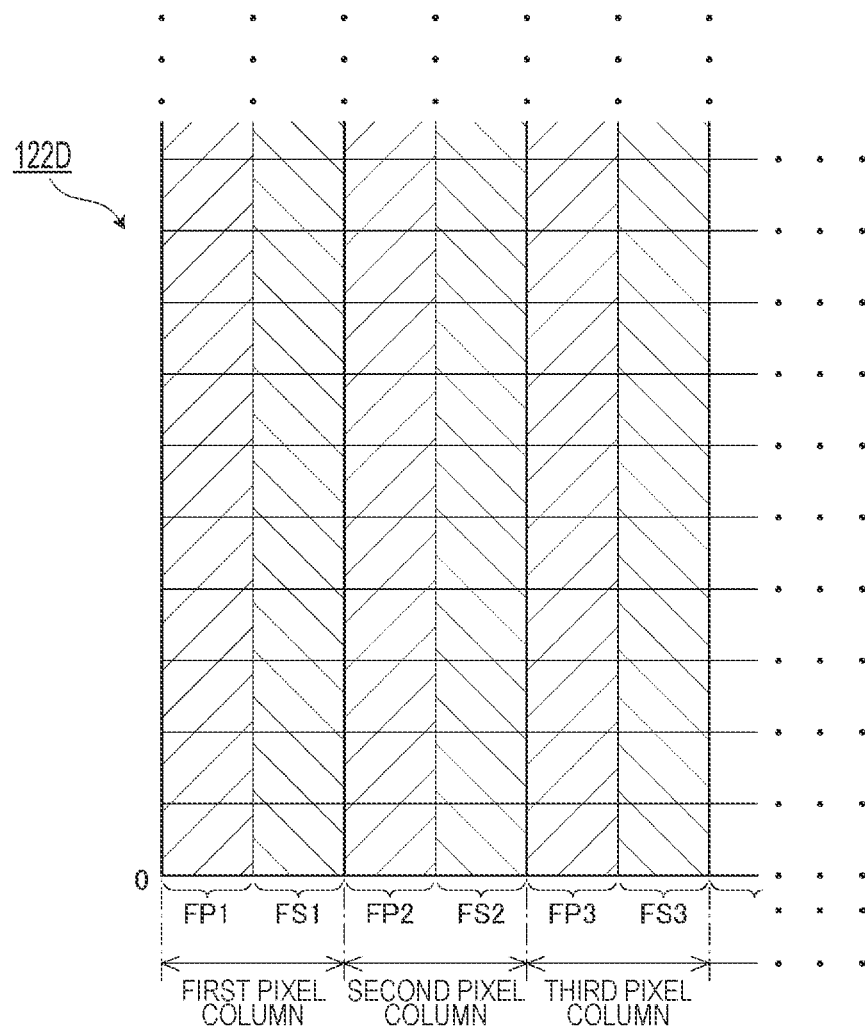
FIG. 19 is a configuration diagram illustrating pixel columns of an EVS of the shape measuring system according to the fourth configuration example of the present disclosure.

Meanwhile, the light receiving part 12E of the present configuration example provided as the light receiving part 12 is configured such that, in the EVS, an area corresponding to each pixel column is divided into two areas, that is, a first divided area and a second divided area on which only the P wave and the S wave are incident, respectively, in a similar pattern to the third configuration example, as illustrated in FIG. 19. Specifically, films having functions similar to those of the first polarizer 114 and the second polarizer 115, that is, a vertical polarization film FP1, FP2, FP3 . . . , which is a first film, and a horizontal polarization film FS1, FS2, FS3, . . . , which is a second film, are provided in the first divided area (hereinafter referred to as a "P-wave area") and the second divided area (hereinafter referred to as an "S-wave area"), respectively, which are the two divided areas corresponding to each pixel of each pixel column of the EVS, in accordance with the respective areas.

Therefore, also in the present configuration example, only the vertically polarized laser light from the first semiconductor laser and the horizontally polarized laser light from the second semiconductor laser can be separately incident on the corresponding areas, that is, a former half area and a latter half area of each pixel column, respectively, as in the third configuration example. Therefore, in the light receiving part 12, laser light having an unnecessary polarization plane, for example, unnecessary secondary reflected light or the like is removed by the vertical polarization film FP and the horizontal polarization film FS having functions equivalent to those of the polarizers even if a vertical polarization plane, a horizontal polarization plane, and the like are mixed in laser light that passes through the lens 121 and is incident on each pixel column (column) in the single EVS 122. Therefore, only laser light of a necessary polarization plane can be selectively incident on each area of each pixel column of the EVS.

Furthermore, also in the fourth configuration example according to the present disclosure, beams of reflected light that travel on shortest paths toward the light receiving part 12 among beams of reflected light (scattered light) emitted from the light source parts 11F and 11G and reflected by the measurement surface 100A of the object 100 to be measured enter the light receiving part 12E as two kinds of regular reflected light, as in the third configuration example. Meanwhile, also in the present configuration example, there may be reflected light (secondary reflected light) that enters the light receiving part 12E, for example, by being reflected at another point and traveling through another optical path after being reflected and scattered by the measurement surface 100A. Even in such a case, an unwanted signal generated in association with the secondary reflected light can be removed by the unwanted signal removing part 132, as in the first to third configuration examples.

Therefore, according to the present configuration example, even in a case where the object 100 to be measured has a large irregularity difference, only laser light of designated polarization planes, specifically, vertically polarized laser light and horizontally polarized laser light can be incident on respective designated areas in each pixel, as in the first configuration example. As a result, an accurate three-dimensional shape can be detected. Furthermore, even in the present configuration example, an EVS is used as the imaging device, and therefore a three-dimensional shape can be measured at high speed.

(2-5. Fifth Configuration Example)

Next, a shape measuring device 10E of a fifth aspect (hereinafter referred to as a "fifth configuration example") according to the shape measuring system of the second embodiment of the present disclosure will be described with reference to FIGS. 20 to 22. Note that, also in the present configuration example, same parts as those of the above configuration examples are given same reference signs, and repeated description thereof is avoided.

The present configuration example is different from the configuration examples described above in that a single light source part 11H is provided and the light source part 11D includes a spectroscopic prism 116 in addition to an LD 111H that emits white light, a cylindrical lens 112, and a scan mechanism 113, and that a single light receiving part 12F is provided and includes, immediately before a lens 121 on a reflected light path relative to the light receiving part 12F, a color filter 125 that selectively transmits light of wavelength bands of three colors, that is, light of wavelengths of red (hereinafter sometimes abbreviated as "R"), green (hereinafter sometimes abbreviated as "G"), and blue (hereinafter sometimes abbreviated as "B"). Note that the color filter 125 includes a first filter (hereinafter referred to as a "filter R") having a wavelength transmission characteristic that transmits only R, a second filter (hereinafter referred to as a "filter G") having a wavelength transmission characteristic that transmits only G, and a third filter (hereinafter referred to as a "filter B") having a wavelength transmission characteristic that transmits only B.

[Light Source Part]

The light source 111H preferably has a wide emission wavelength band. In the present configuration example, a semiconductor laser (hereinafter sometimes referred to as a "white semiconductor laser 111H") that emits white laser light covering a visible light region of an oscillation wavelength region of 380 nm to 760 nm is used. As the light source 111H, for example, a white LED obtained by coating a blue LED with a phosphorescent material so that a part of blue light is converted into green, yellow, and red light can be used as long as light in a wide band is emitted, but a light source having high luminance and directivity is preferable.

The prism 116 disperses and divides the white light emitted from the white semiconductor laser 111H. The laser light incident on the prism 116 of the present configuration example is dispersed and separated into spectra of seven colors due to a difference in refractive index at each wavelength after passing through the prism 116.

Figure 21:
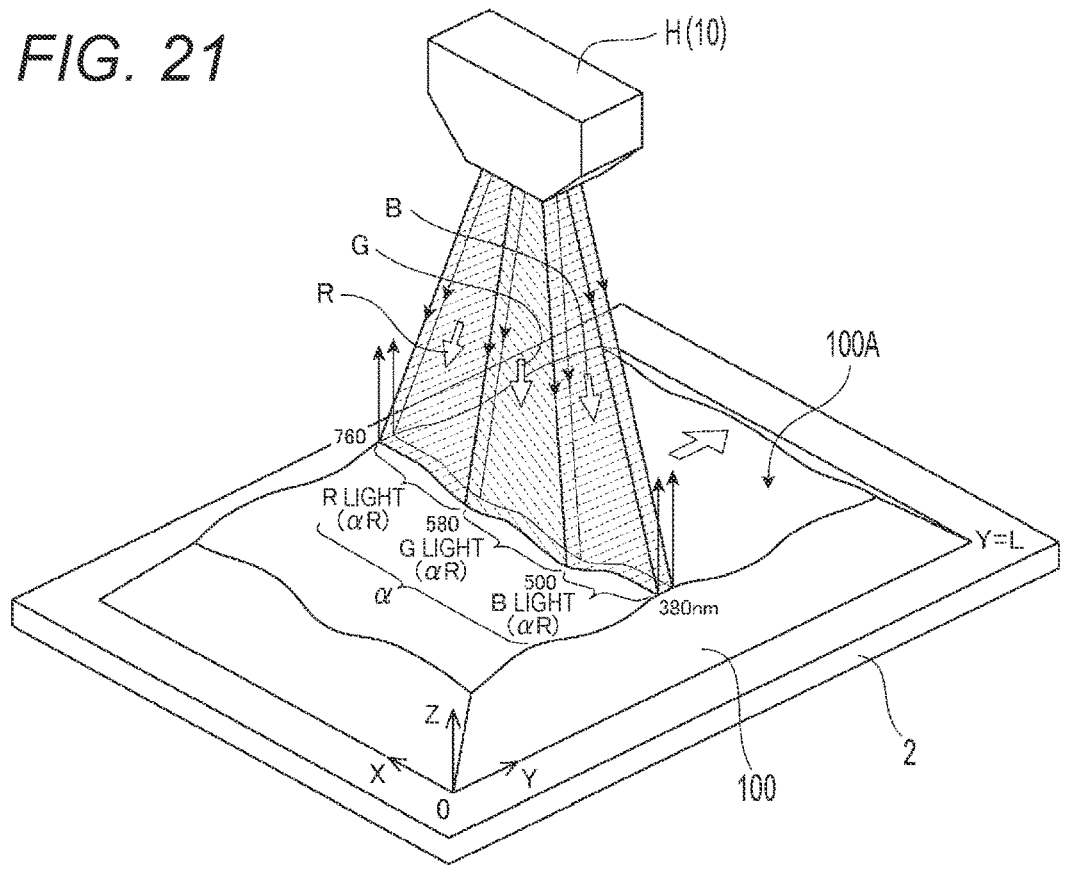
FIG. 21 is an explanatory view illustrating a light projection state of each slit light divided into three wavelengths of R, G, and B that are incident light in a light source part of a shape measuring system according to the fifth configuration example of the present disclosure.

As illustrated in FIG. 21, the prism 116 of the present configuration example roughly separates and divides incident light into three types of wavelength bands (R, G, and B wavelength bands). The three types of incident light α are blue incident light of approximately 380 nm to 500 nm (hereinafter referred to as B light: $\alpha_B$), green incident light of 500 nm to 580 nm (hereinafter referred to as G light: $\alpha_G$), and red incident light of 580 nm to 760 nm (hereinafter referred to as R light: $\alpha_R$). Note that, in the present disclosure, visible light having a wavelength width of, for example, 380 nm to 760 nm can be separated and divided into finer groups. In this case, it is preferable to use a color filter having the same wavelength transmission characteristic as a color filter on a light receiving part side, which will be described later.

[Light Receiving Part]

Figure 20:
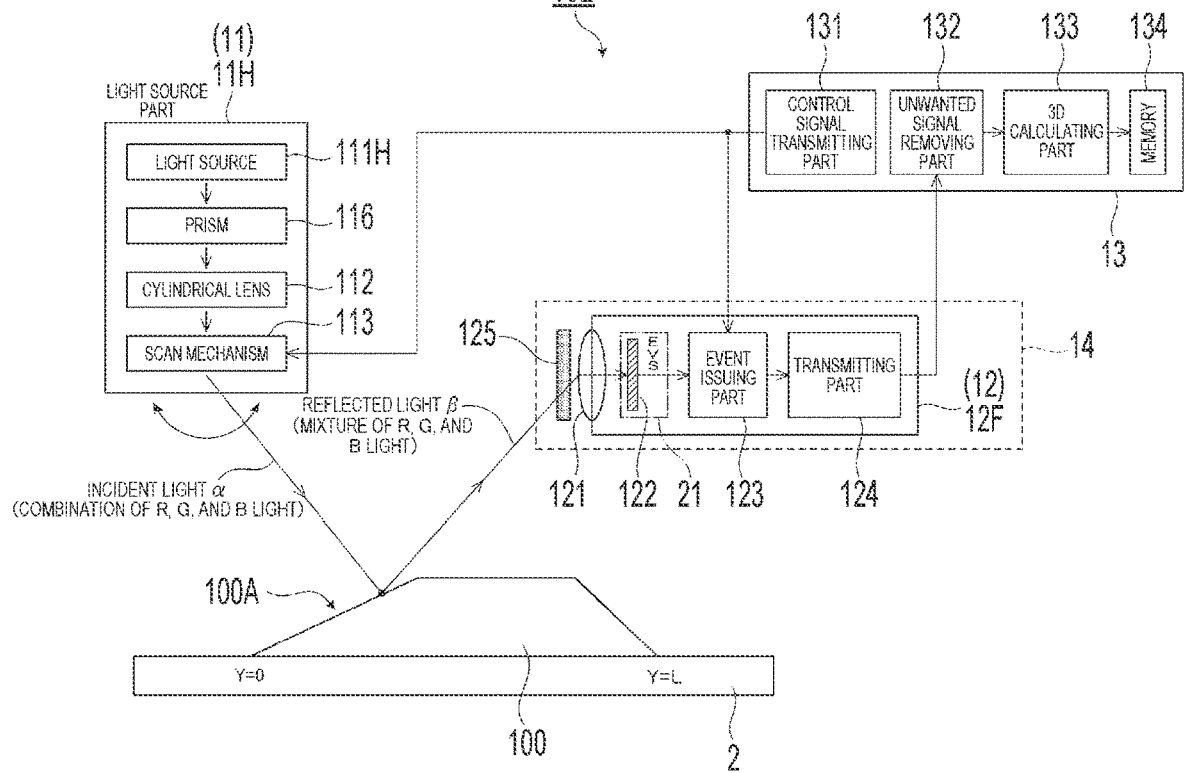
FIG. 20 is a block diagram illustrating a configuration of a shape measuring system according to a fifth configuration example of the present disclosure.
Figure 22:
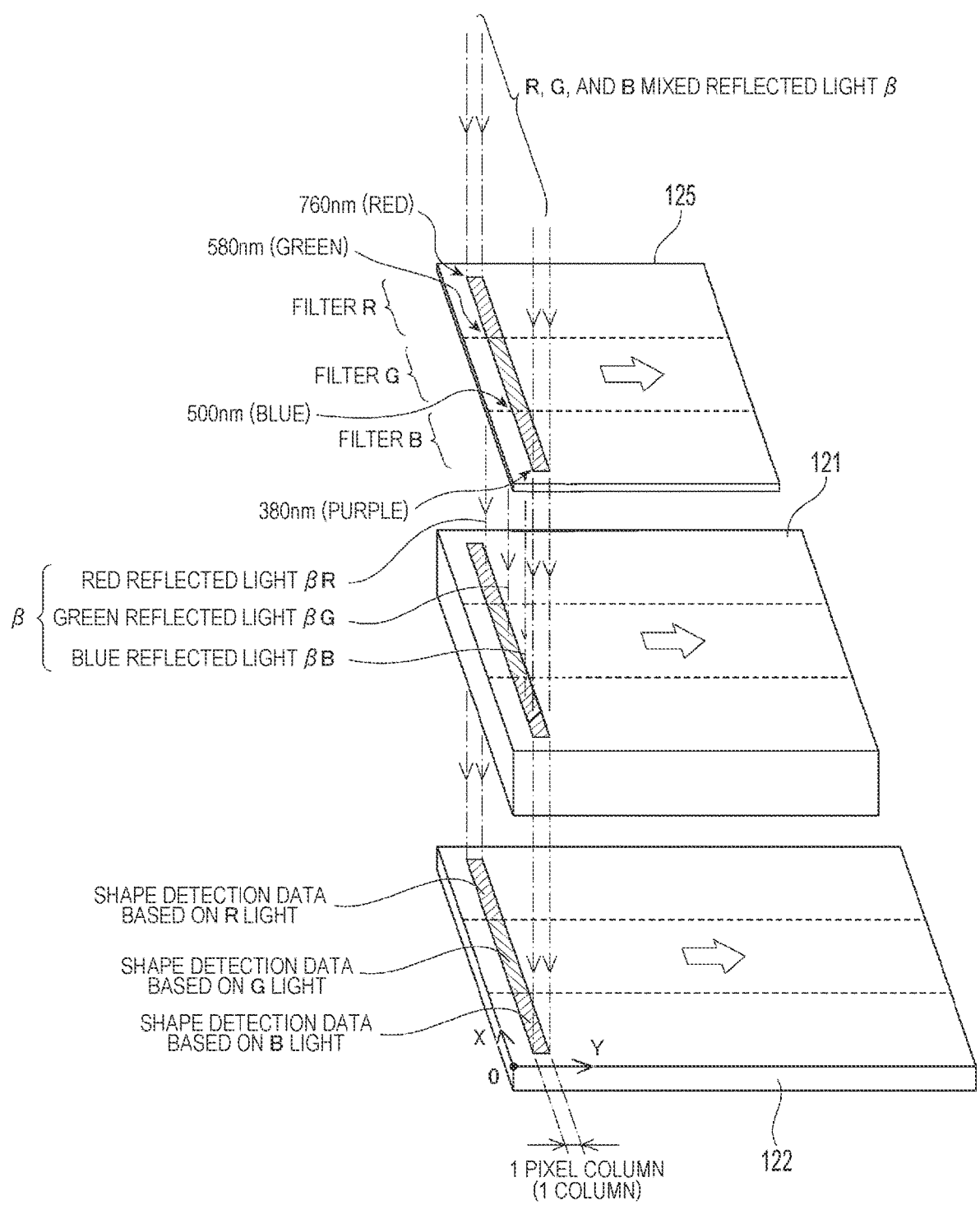
FIG. 22 is an explanatory view illustrating an incident state of reflected light divided into three wavelengths of R, G, and B in a light receiving part of the shape measuring system according to the fifth configuration example of the present disclosure.

The light receiving part 12F has basically a similar configuration to the first and second configuration examples described above, but further includes the color filter 125 as illustrated in FIGS. 20 and 22, as described above. Typically, light having a same wavelength (light incident on the light receiving part 12F) travels toward and enters a measurement surface of an object to be measured while traveling on a unique optical path (uniquely determined minimum optical path) that is a shortest optical distance according to the Fermat's principle (principle of least action) as is well known. Furthermore, the basic principle is that reflected light returns in a same direction or the like by traveling on a same optical path (minimum optical path) as incident light having a shortest optical distance again (reversibility of light).

This principle is used in the present configuration example of the present disclosure. As a result, regular incident light becomes regular reflected light and enters each pixel column of the EVS 122. That is, the regular reflected light of each of the colors R, G, and B can enter a corresponding same wavelength area of three divided areas including the color filter 125 of the same colors R, G, and B (that is, the filter R, the filter G, and the filter B). The color filter 125 can be unitized or modularized as a light receiving function unit by being fixed in a housing 14 (see FIG. 20) that houses the light receiving part 12. Furthermore, in a case where the color filter 125 has a thin film shape, the color filter 125 may be directly attached to the lens 121.

Note that, in order to more effectively exhibit the wavelength transmission characteristic of the color filter 125 and ensure an effective regular reflected light capturing function, it is preferable to use a lens having a high collimating function as the lens 121 immediately following the color filter 125 so that light that has passed through each color filter portion travel to the same pixel in the pixel column. For example, a SELFOC (registered trademark) lens, a collimator, or the like can be used. Therefore, for example, return light of a B component that is incident on and passes through the filter B of the color filter 125 can be incident on a corresponding pixel portion as collimated light without shifting the position with respect to a pixel in the depth (X) direction in the pixel column of the EVS 122 after passing through the lens 121. A similar action can be obtained by the color filter 125 as for return light of other color components (an R component and a G component).

[Action and Effect]

Therefore, according to the present configuration example, beams of light of the RGB wavelengths emitted from the light source part 11H, dispersed, and projected to the object 100 to be measured is reflected by the measurement surface 100A and then incident on the color filter 125, as illustrated in FIGS. 20 and 22. As illustrated in FIG. 21, slit light dispersed into RGB, which is laser light of 380 nm to 760 nm, emitted from the light source part 11H is reflected by the measurement surface 100A. Regular reflected light among beams of reflected light returns toward the color filter 125 by traveling on a shortest path having a shortest optical distance as compared with other reflected light.

Each of the beams of regular reflected light of R, G, and B incident on the color filter 125 may be incident on other color component areas in addition to an area of the same color component in the color filter 125. However, for example, even if the B light $\alpha_B$ is incident on an area (that is, the filter R or the filter G) of a color component different from the filter B, the B light $\alpha_B$ is absorbed by the filter R or the filter G in the area. Therefore, the B light $\alpha_B$ is prevented from being incident on a pixel corresponding to the R light or the G light. In this manner, only reflected light of a B component that has passed through the filter B can enter a specific pixel corresponding to the filter B. Therefore, as for R, G, and B regular reflected light, even if return light of an R, G, or B color component strays into another R, G, or B color component area as stray light, the stray light is absorbed without passing through the color filter 125.

Therefore, according to the fifth configuration example, on each pixel of each pixel column, only regular reflected light from a specific area of the measurement surface corresponding to the pixel can be incident. Therefore, there is no possibility that data regarding shapes of other areas within the measurement surface is mixed, and therefore it is possible to perform accurate shape measurement. Furthermore, image information is generated by using regular reflected light as reflected light that is reflected on each reflection surface and is then incident. Therefore, even if an irregularity difference of the measurement surface is large, an accurate shape of the measurement surface can be generated.

That is, also in the fifth configuration example according to the present disclosure, beams of reflected light that travel on shortest paths toward the light receiving part 12F among beams of reflected light (scattered light) of R, G, and B emitted from the light source part 11H, dispersed by the prism 116, traveling on different optical paths, and reflected and scattered by the measurement surface 100A of the object 100 to be measured enter the light receiving part 12F as regular reflected light of R, G, and B, as in the above configuration examples. Meanwhile, also in the present configuration example, there may be reflected light (secondary reflected light) that enters the light receiving part 12F, for example, by being reflected by another portion and traveling through another optical path after being reflected and scattered by the measurement surface 100A. Even if there is such reflected light, data obtained from the regular reflected light among reflected light captured in the R, G, and B pixel areas 122 is unique, as in the above configuration examples. Therefore, in each of the R, G, and B pixel areas 122, an unwanted signal related to secondary reflected light that generates data different from this data can be removed later by an unwanted signal removing part 132.

As described above, according to the present configuration example, there is a possibility that secondary reflected light of a color component is allowed to pass through an area of the same color component by the color filter 125 in a similar manner to the regular reflected light. However, even if an unwanted signal is generated from the secondary reflected light, the signal can be removed by the unwanted signal removing part 132 of the signal processing unit 13 as described above. As a result, in each of the R, G, and B pixel areas 122, even if secondary reflected light that is light of another one of R, G, and B and that may cause erroneous data enters the EVS 122, this can be effectively removed.

The embodiments and the configuration examples of the shape measuring system according to the present disclosure have been described above. Finally, the description of the embodiments and the configuration examples described above is an example of the present disclosure, and the present disclosure is not limited to the above embodiments and configuration examples. Therefore, needless to say, in addition to the above embodiments and configuration examples, various changes can be made according to the design and the like without departing from the technical idea according to the present disclosure. Furthermore, the effects described in the present specification are merely examples and are not limited. Furthermore, there may be other effects.

Note that the drawings in the above embodiments and configuration examples are schematic, and dimensional ratios and the like of each part may not necessarily match actual ones. It is needless to say that the drawings include portions having different dimensional relationships and ratios. As for a vibration state of a light wave of measurement light described in the above embodiments and configuration examples, various modes such as circularly polarized light, elliptically polarized light, and linearly polarized light can be applied as long as a similar effect can be obtained.

Furthermore, as described above, the shape measuring system of the present disclosure is not particularly limited to, for example, shape measurement of a large number of products sent one after another in a factory or the like. That is, the present disclosure may be used to capture a temporal change in a case where a static or dynamic single target object or specific target area is observed, monitored, or measured. For example, the present disclosure can be, for example, applied to a fixed point observation/monitoring system such as a camera for monitoring in a station, a camera in a parking lot, or an in-vehicle camera.

3. Configurations Which Present Disclosure Can Take

Note that the present disclosure can also have the following configurations.

(1) A shape measuring system including:
  a light source part that emits measurement light to a measurement target;
  a light receiving part that receives reflected light that is the measurement light reflected from the measurement target;
  a signal processing part including a three-dimensional shape calculating part that calculates a three-dimensional shape of the measurement target on the basis of event data generated from the reflected light reflected by the measurement target and incident on the light receiving part and an unwanted signal removing part that removes an unwanted signal generated when unwanted light other than the reflected light is incident on the light receiving part from an outside; and
  a scan mechanism that sweep-scans the measurement target with the measurement light projected from the light source part to the measurement target by moving the light source part or the measurement target.

(2) The shape measuring system according to (1), in which
  the scan mechanism is provided in the light source part;
  the light source part includes a light source and a waveform control lens that performs waveform control of light from the light source; and
  the light receiving part includes a light receiving lens, an event-based vision sensor (EVS), which is an asynchronous imaging element that captures a temporal change of reflected light passing through the light receiving lens among beams of the reflected light and outputs an event signal, an event issuing part that detects an event on the basis of output data from the EVS and outputs event data, and a transmitting part that outputs the event data to the signal processing part.

(3) The shape measuring system according to (2), in which
  the light source part is a single light source part; and
  a first light receiving part and a second light receiving part whose positions are shifted from each other are provided as the light receiving part.

(4) The shape measuring system according to (2), in which
  a first light source part and a second light source part whose positions are shifted from each other are provided as the light source part;
  the light receiving part is a single light receiving part; and
  the signal processing part includes a control signal transmitting part that outputs a control signal to each of the scan mechanisms at time-divided time intervals for each pixel column.

(5) The shape measuring system according to (2), in which
  a first light source part including a first light source that emits light having a first wavelength and a second light source part including a second light source that emits light having a second wavelength are provided as the light source part;

the light receiving part is a single light receiving part;

the EVS includes two divided areas that are a first divided area and a second divided area in each pixel column;

among measurement light having two different types of wavelengths emitted from the light sources, light having the first wavelength and light having the second wavelength are reflected by the measurement target, and the first divided area includes a first filter having a first wavelength transmission characteristic that selectively transmits the reflected light having the first wavelength; and the second divided area includes a second filter having a second wavelength transmission characteristic that selectively transmits the light having the second wavelength.

(6) The shape measuring system according to (5), in which the light having the first wavelength is light having a blue wavelength, and the light having the second wavelength is light having a red wavelength.

(7) The shape measuring system according to (2), in which a first light source part including the first light source and a second light source part including a second light source are provided as the light source part;

the first light source part includes a first optical element that generates first measurement light having a first polarization plane from light emitted from the first light source;

the second light source part includes a second optical element that generates second measurement light having a second polarization plane from light emitted from the second light source;

the light receiving part is a single light receiving part;

the EVS is divided into two areas that are a first divided area and a second divided area for each pixel column;

of two types of measurement light that are the first measurement light and the second measurement light, first reflected light having the first polarization plane and second reflected light having the second polarization plane are reflected by the measurement target and incident on the light receiving part, and the first divided area includes a first film that selectively transmits the first reflected light; and the second divided area includes a second film that selectively transmits the second reflected light.

(8) The shape measuring system according to (7), in which the first polarization plane is linearly polarized light vibrating in a vertical direction, and the second polarization plane is linearly polarized light vibrating in a horizontal direction.

(9) The shape measuring system according to (2), in which the light source part is a single light source part;

the light source in the light source part includes dividing means for dividing light from the light source into at least three types of wavelength bands;

the light receiving part is a single light receiving part;

the EVS includes three divided areas that are a first to third divided areas for each pixel column;

among measurement light of the three different types of wavelength bands emitted from the light source, reflected light of the three types of wavelength bands are reflected by the measurement target, and the first divided area includes a first color filter having a wavelength transmission characteristic that selectively transmits reflected light of a first wavelength band among the reflected light of the three types of wavelength bands;

the second divided area includes a second color filter having a wavelength transmission characteristic that selectively transmits reflected light of a second wavelength band among the reflected light of the three types of wavelength bands reflected by the measurement target; and the third divided area includes a third color filter having a wavelength transmission characteristic that selectively transmits reflected light of a third wavelength band among the reflected light of the three types of wavelength bands reflected by the measurement target.

(10) The shape measuring system according to (9), in which the dividing means includes a prism that divides white light from the light source into light of three types of wavelength bands; and the light of the three types of wavelength bands is light of a red wavelength band, light of a green wavelength band, and light of a blue wavelength band.

(11) The shape measuring system according to (2), in which the EVS compares a signal voltage based on a temporal change of the reflected light with a threshold voltage, and outputs an event signal by determining that the signal voltage is smaller than or larger than the threshold voltage.

REFERENCE SIGNS LIST

1 Shape measuring system
2 Stage (measurement stage)
3 Movement mechanism (scan mechanism)
4 Control part
10, 10A to 10E Shape measurement device
11 Light source part
11A First light source part
11B Second light source part
11D First light source part
11E Second light source part
11F Light source part
111 Light source: semiconductor laser (LD)
111A First semiconductor laser (LD1)
111B Second semiconductor laser (LD2)
111C Third semiconductor laser (LD3)
111F LD
112 Cylindrical lens (waveform forming lens, waveform control lens)
113 Scan mechanism
114 First polarizer (optical element)
115 Second polarizer (optical element)
116 Prism
12, 12C, 12D, 12E, 12F Light receiving part
12A First light receiving part
12B Second light receiving part
121 Light receiving lens
122, 122A, 122B Asynchronous (non-scanning) imaging device (imaging element) (EVS, EVS1, EVS2)
123 Event issuing part
124 Transmitting part
13 Signal processing part (signal processing part)
131 Control signal transmitting part
132 Unwanted signal removing part
133 3D calculating part
134 Memory 21 Imaging part
211 Pixel array part
212 Drive part
213 Arbiter part
214 Column processing part
215 Signal processing part
210 Pixel
41 System control part
42 Movement control part
51 Photoelectric conversion part
52 Pixel signal generating part
53 Address event detecting part
513 OFG transistor
531 Current-voltage conversion part
532 Buffer
533 Subtractor
534 Quantizer
535 Transfer part
100 Object to be measured
100A Measurement surface
A1, A2 Optical axis
BF Blue filter (first filter)
RF Red filter (second filter)
FP Vertical polarization film (first film)
FS Horizontal polarization film (second film)
FR Filter R (first filter)
FG Filter G (second filter)
FB Filter B (third filter)
H Head
X Depth direction
Y Lateral direction
Z Height direction
α Incident light (measurement light)
$α_R$ Red incident light (R light)
$α_G$ Green incident light (G light)
$α_B$ Blue incident light (B light)
β Reflected light
β1 Reflected light
β2 Reflected light

The invention claimed is:

1. A shape measuring system comprising:
a light source part that emits measurement light to a measurement target;
a light receiving part that receives reflected light that is the measurement light reflected from the measurement target;
a signal processor configured to calculate a three-dimensional shape of the measurement target on a basis of event data generated from the reflected light reflected by the measurement target and incident on the light receiving part and to remove an unwanted signal generated when unwanted light other than the reflected light is incident on the light receiving part from an outside; and
a scan mechanism that sweep-scans the measurement target with the measurement light projected from the light source part to the measurement target by moving the light source part or the measurement target, wherein
the scan mechanism is provided in the light source part,
the light source part includes a light source and a waveform control lens that performs waveform control of light from the light source,
the light receiving part includes a light receiving lens, an event-based vision sensor (EVS), which is an asynchronous imaging element that captures a temporal change of reflected light passing through the light receiving lens among beams of the reflected light and outputs an event signal, an event issuing part that detects an event on a basis of output data from the EVS and outputs event data, and a transmitting part that outputs the event data to the signal processor,
the light source part is a single light source part, and
a first light receiving part and a second light receiving part whose positions are shifted from each other are provided as the light receiving part.

2. The shape measuring system according to claim 1, wherein
the EVS compares a signal voltage based on a temporal change of the reflected light with a threshold voltage, and outputs an event signal by determining that the signal voltage is smaller than or larger than the threshold voltage.

3. A shape measuring system comprising:
a light source part that emits measurement light to a measurement target;
a light receiving part that receives reflected light that is the measurement light reflected from the measurement target;
a signal processor configured to calculate a three-dimensional shape of the measurement target on a basis of event data generated from the reflected light reflected by the measurement target and incident on the light receiving part and to remove an unwanted signal generated when unwanted light other than the reflected light is incident on the light receiving part from an outside; and
a scan mechanism that sweep-scans the measurement target with the measurement light projected from the light source part to the measurement target by moving the light source part or the measurement target, wherein
the scan mechanism is provided in the light source part,
the light source part includes a light source and a waveform control lens that performs waveform control of light from the light source,
the light receiving part includes a light receiving lens, an event-based vision sensor (EVS), which is an asynchronous imaging element that captures a temporal change of reflected light passing through the light receiving lens among beams of the reflected light and outputs an event signal, an event issuing part that detects an event on a basis of output data from the EVS and outputs event data, and a transmitting part that outputs the event data to the signal processor,
a first light source part and a second light source part whose positions are shifted from each other are provided as the light source part,
the light receiving part is a single light receiving part, and
the signal processor is configured to output a control signal to each of respective scan mechanisms at time-divided time intervals for each pixel column.

4. A shape measuring system comprising:
a light source part that emits measurement light to a measurement target;
a light receiving part that receives reflected light that is the measurement light reflected from the measurement target;
a signal processor configured to calculate a three-dimensional shape of the measurement target on a basis of event data generated from the reflected light reflected by the measurement target and incident on the light receiving part and to remove an unwanted signal generated when unwanted light other than the reflected light is incident on the light receiving part from an outside; and a scan mechanism that sweep-scans the measurement target with the measurement light projected from the light source part to the measurement target by moving the light source part or the measurement target, wherein the scan mechanism is provided in the light source part, the light source part includes a light source and a waveform control lens that performs waveform control of light from the light source, the light receiving part includes a light receiving lens, an event-based vision sensor (EVS), which is an asynchronous imaging element that captures a temporal change of reflected light passing through the light receiving lens among beams of the reflected light and outputs an event signal, an event issuing part that detects an event on a basis of output data from the EVS and outputs event data, and a transmitting part that outputs the event data to the signal processor, a first light source part including a first light source that emits light having a first wavelength and a second light source part including a second light source that emits light having a second wavelength are provided as the light source part, the light receiving part is a single light receiving part, the EVS includes two divided areas that are a first divided area and a second divided area in each pixel column, among measurement light having two different types of wavelengths emitted from the first light source and the second light source, light having the first wavelength and light having the second wavelength are reflected by the measurement target, and the first divided area includes a first filter having a first wavelength transmission characteristic that selectively transmits the reflected light having the first wavelength, and the second divided area includes a second filter having a second wavelength transmission characteristic that selectively transmits the light having the second wavelength.

5. The shape measuring system according to claim 4, wherein the light having the first wavelength is light having a blue wavelength, and the light having the second wavelength is light having a red wavelength.

6. A shape measuring system comprising:

a light source part that emits measurement light to a measurement target;

a light receiving part that receives reflected light that is the measurement light reflected from the measurement target;

a signal processor configured to calculate a three-dimensional shape of the measurement target on a basis of event data generated from the reflected light reflected by the measurement target and incident on the light receiving part and to remove an unwanted signal generated when unwanted light other than the reflected light is incident on the light receiving part from an outside; and a scan mechanism that sweep-scans the measurement target with the measurement light projected from the light source part to the measurement target by moving the light source part or the measurement target, wherein the scan mechanism is provided in the light source part, the light source part includes a light source and a waveform control lens that performs waveform control of light from the light source, the light receiving part includes a light receiving lens, an event-based vision sensor (EVS), which is an asynchronous imaging element that captures a temporal change of reflected light passing through the light receiving lens among beams of the reflected light and outputs an event signal, an event issuing part that detects an event on a basis of output data from the EVS and outputs event data, and a transmitting part that outputs the event data to the signal processor, a first light source part including a first light source and a second light source part including a second light source are provided as the light source part, the first light source part includes a first optical element that generates first measurement light having a first polarization plane from light emitted from the first light source, the second light source part includes a second optical element that generates second measurement light having a second polarization plane from light emitted from the second light source, the light receiving part is a single light receiving part, the EVS is divided into two areas that are a first divided area and a second divided area for each pixel column, of two types of measurement light that are the first measurement light and the second measurement light, first reflected light having the first polarization plane and second reflected light having the second polarization plane are reflected by the measurement target and incident on the light receiving part, and the first divided area includes a first film that selectively transmits the first reflected light, and the second divided area includes a second film that selectively transmits the second reflected light.

7. The shape measuring system according to claim 6, wherein the first polarization plane is linearly polarized light vibrating in a vertical direction, and the second polarization plane is linearly polarized light vibrating in a horizontal direction.

8. A shape measuring system comprising:

a light source part that emits measurement light to a measurement target;

a light receiving part that receives reflected light that is the measurement light reflected from the measurement target;

a signal processor configured to calculate a three-dimensional shape of the measurement target on a basis of event data generated from the reflected light reflected by the measurement target and incident on the light receiving part and to remove an unwanted signal generated when unwanted light other than the reflected light is incident on the light receiving part from an outside; and a scan mechanism that sweep-scans the measurement target with the measurement light projected from the light source part to the measurement target by moving the light source part or the measurement target, wherein the scan mechanism is provided in the light source part, the light source part includes a light source and a waveform control lens that performs waveform control of light from the light source, the light receiving part includes a light receiving lens, an event-based vision sensor (EVS), which is an asynchronous imaging element that captures a temporal change of reflected light passing through the light receiving lens among beams of the reflected light and outputs an event signal, an event issuing part that detects an event on a basis of output data from the EVS and outputs event data, and a transmitting part that outputs the event data to the signal processor, the light source part is a single light source part, the light source in the light source part includes dividing means for dividing light from the light source into at least three types of wavelength bands, the light receiving part is a single light receiving part, the EVS includes a first divided area, a second divided area and a third divided area for each pixel column, among measurement light of the three types of wavelength bands emitted from the light source, reflected light of the three types of wavelength bands are reflected by the measurement target, and the first divided area includes a first filter having a wavelength transmission characteristic that selectively transmits reflected light of a first wavelength band among the reflected light of the three types of wavelength band, the second divided area includes a second filter having a wavelength transmission characteristic that selectively transmits reflected light of a second wavelength band among the reflected light of the three types of wavelength bands reflected by the measurement target, and the third divided area includes a third filter having a wavelength transmission characteristic that selectively transmits reflected light of a third wavelength band among the reflected light of the three types of wavelength bands reflected by the measurement target.

9. The shape measuring system according to claim 8, wherein the dividing means includes a prism that divides white light from the light source into light of three types of wavelength bands; and the light of the three types of wavelength bands is light of a red wavelength band, light of a green wavelength band, and light of a blue wavelength band.

* * * * *